(12) United States Patent
Lee et al.

(10) Patent No.: US 8,643,813 B2
(45) Date of Patent: Feb. 4, 2014

(54) LIQUID CRYSTAL DISPLAY

(75) Inventors: Gak Seok Lee, Cheonan-si (KR); Youn Hak Jeong, Cheonan-si (KR); Ki Chul Shin, Suwon-si (KR)

(73) Assignee: Samsung Display Co., Ltd. (KR)

( * ) Notice: Subject to any disclaimer, the term of this patent is extended or adjusted under 35 U.S.C. 154(b) by 18 days.

(21) Appl. No.: 13/550,261

(22) Filed: Jul. 16, 2012

(65) Prior Publication Data
US 2013/0229608 A1   Sep. 5, 2013

(30) Foreign Application Priority Data

Mar. 5, 2012   (KR) .................. 10-2012-0022386

(51) Int. Cl.
*G02F 1/1337*   (2006.01)
(52) U.S. Cl.
USPC .......................................... 349/129; 349/146
(58) Field of Classification Search
USPC ....................................................... 349/129
See application file for complete search history.

(56) References Cited

U.S. PATENT DOCUMENTS

| | | | |
|---|---|---|---|
| 6,903,791 B2 | 6/2005 | Sasaki | |
| 7,697,093 B2 | 4/2010 | Chan et al. | |
| 7,724,333 B2 | 5/2010 | Sohn et al. | |
| 7,760,310 B2 | 7/2010 | Chen et al. | |
| 2009/0284673 A1 | 11/2009 | Kim et al. | |
| 2010/0019998 A1 | 1/2010 | You et al. | |
| 2010/0123845 A1 | 5/2010 | Kim et al. | |
| 2011/0157537 A1 | 6/2011 | Chen et al. | |

FOREIGN PATENT DOCUMENTS

| | | |
|---|---|---|
| JP | 2004-037852 A | 2/2004 |
| JP | 2010-008919 A | 1/2010 |
| KR | 10-2000-0073288 A | 12/2000 |
| KR | 10-0648215 | 11/2006 |
| KR | 1020120050645 A | 5/2012 |

*Primary Examiner* — Richard Kim
(74) *Attorney, Agent, or Firm* — Innovation Counsel LLP

(57) ABSTRACT

A liquid crystal display includes: a first substrate and a second substrate facing each other; a liquid crystal layer between the first substrate and the second substrate; a lower pixel electrode positioned on the first substrate; a first passivation layer positioned on the lower pixel electrode; an upper pixel electrode positioned on the first passivation layer; and an opposing electrode positioned on the second substrate, wherein the upper pixel electrode comprises a stem and a plurality of minute branches extending outwardly from the stem, and the lower pixel electrode comprises a main body overlapping the plurality of minute branches and at least one bar-shaped portion extending along an edge of the main body maintaining a predetermined gap with the edge of the main body.

20 Claims, 25 Drawing Sheets

FIG.22
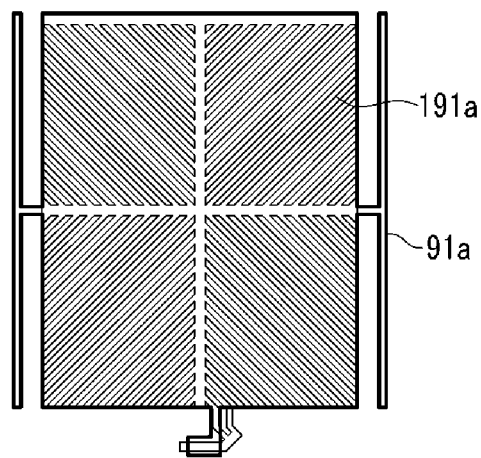
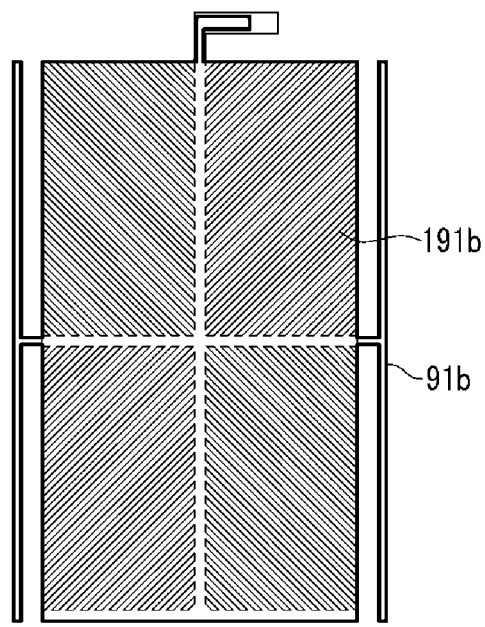

FIG.25
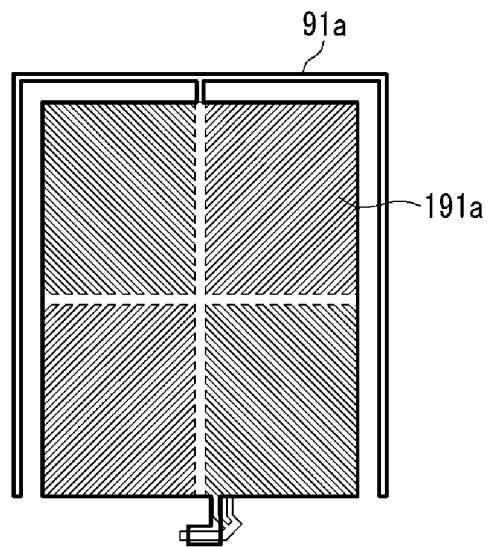
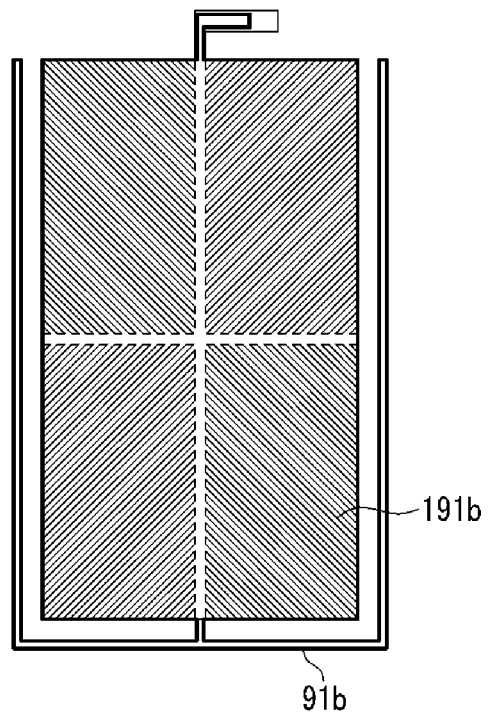

LIQUID CRYSTAL DISPLAY

CROSS-REFERENCE TO RELATED APPLICATION

This application claims priority to and the benefit of Korean Patent Application No. 10-2012-0022386 filed in the Korean Intellectual Property Office on Mar. 5, 2012, the entire contents of which are incorporated herein by reference.

BACKGROUND OF THE INVENTION (a) Field of the Invention

The present invention relates to a liquid crystal display.

(b) Description of the Related Art

As one of the most widely used types flat panel displays, a liquid crystal displays (LCD) includes two panels provided with field generating electrodes, such as pixel electrodes and a common electrode, and a liquid crystal (LC) layer interposed between the two panels. LCDs display images by applying voltages to the field-generating electrodes to generate an electric field in the LC layer that determines the orientation of LC molecules therein to adjust polarization of incident light.

Among the LCDs, a vertical alignment (VA) mode LCD, which aligns LC molecules such that their long axes are perpendicular to the panels in the absence of an electric field, has a high contrast ratio and wide reference viewing angle.

In a vertical alignment (VA) mode LCD, the wide reference viewing angle can be realized by forming, in one pixel, a plurality of domains that include liquid crystals having different alignment directions.

in one example for forming such a plurality of domains in a single pixel, cutouts of minute slits are formed in the field generating electrodes. In this method, the plurality of domains may be formed by aligning the liquid crystal molecules vertically with respect to a fringe field generated between the edges of the cutouts and the field generating electrodes facing the edges.

The above information disclosed in this Background section is only for enhancement of understanding and therefore it may contain information that does not form the prior art that is already known to a person of ordinary skill in the art.

SUMMARY OF THE INVENTION

A liquid crystal display provides improved transmittance by controlling a fringe field on an edge portion of a pixel electrode.

In one aspect, a liquid crystal display includes: a first substrate and a second substrate facing each other; a liquid crystal layer between the first substrate and the second substrate; a lower pixel electrode positioned on the first substrate; a first passivation layer positioned on the lower pixel electrode; an upper pixel electrode positioned on the first passivation layer; and an opposing electrode positioned on the second substrate, wherein the upper pixel electrode comprises a stem and a plurality of minute branches extending outwardly from the stem, and the lower pixel electrode comprises a main body overlapping the plurality of minute branches and at least one bar-shaped portion extending along an edge of the main body maintaining a gap with the edge of the main body.

A position of an edge of the upper pixel electrode may be arranged in one of: alignment with an outer edge of the bar-shaped portion of the lower pixel electrode, alignment with the edge of the main body facing the bar-shaped portion, and between the outer edge of the bar-shaped portion of the lower pixel electrode and the edge of the main body facing the bar-shaped portion.

The lower pixel electrode and the upper pixel electrode may be electrically connected to each other.

At least one connector connecting the bar-shaped portion and the main body may be further included.

Ends of the minute branch electrodes of the upper pixel electrode facing the bar-shaped portion may be separated from each other.

The upper pixel electrode may further include a connection branch connecting the ends of the minute branch electrodes of the upper pixel electrode that do not face the bar-shaped portion.

A length of the bar-shaped portion may be equal to or more than ½ of a length of the edge of the main body facing the bar-shaped portion.

A width of the connector may be larger than 0 and less than a sum of a width of the stem of the upper pixel electrode and 1 μm.

A width of the bar-shaped portion may be more than 0 and less than 10 μm.

A length of the connector may be larger than 0.

The lower pixel electrode may comprise a first lower sub-pixel electrode and a second lower sub-pixel electrode that are supplied with different voltages obtained from a same image information, and the upper pixel electrode may comprise a first upper sub-pixel electrode and a second upper sub-pixel electrode that are supplied with different voltages obtained from the same image information.

In a liquid crystal display, transmittance may be improved in the edge portion of the pixel electrode.

BRIEF DESCRIPTION OF THE DRAWINGS

FIG. 21 and FIG. 22 are layout views showing the lower pixel electrode and the upper pixel electrode of FIG. 20 together, FIG. 24 and FIG. 25 are layout views showing the lower pixel electrode and the upper pixel electrode of FIG. 23 together.

DETAILED DESCRIPTION OF THE EMBODIMENTS

Figure 1:
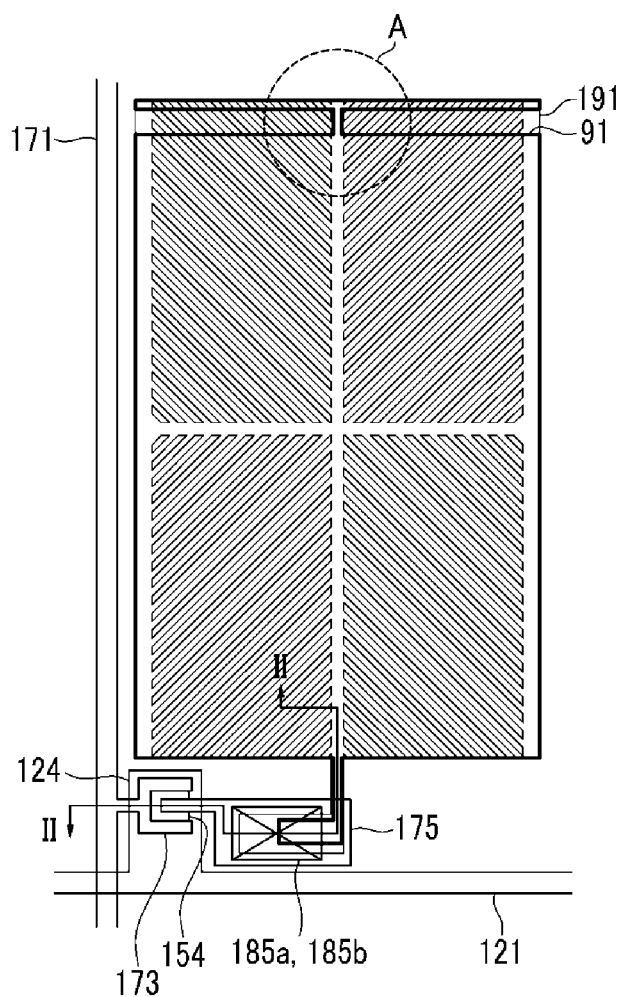
FIG. 1 is a layout view of one pixel of a liquid crystal display according to an exemplary embodiment.

Exemplary embodiments will be described more fully hereinafter with reference to the accompanying drawings, in which exemplary embodiments are shown. As those skilled in the art would realize, the described embodiments may be modified in various different ways, all without departing from the spirit or scope of the present disclosure.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present.

Firstly, a liquid crystal display according to an exemplary embodiment will be described with reference to FIG. 1, FIG. 2, FIG. 3, FIG. 4, FIG. 5, FIG. 6, and FIG. 7.

Figure 2:
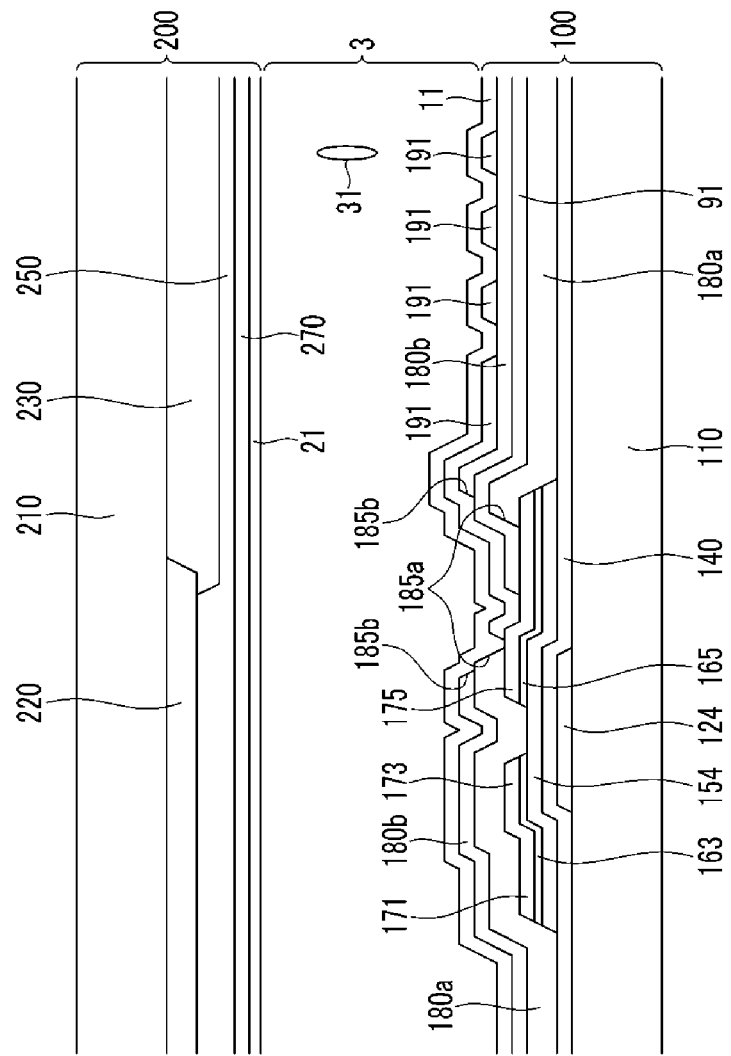
FIG. 2 is a cross-sectional view of the liquid crystal display of FIG. 1 taken along the line II-II.
Figure 3:
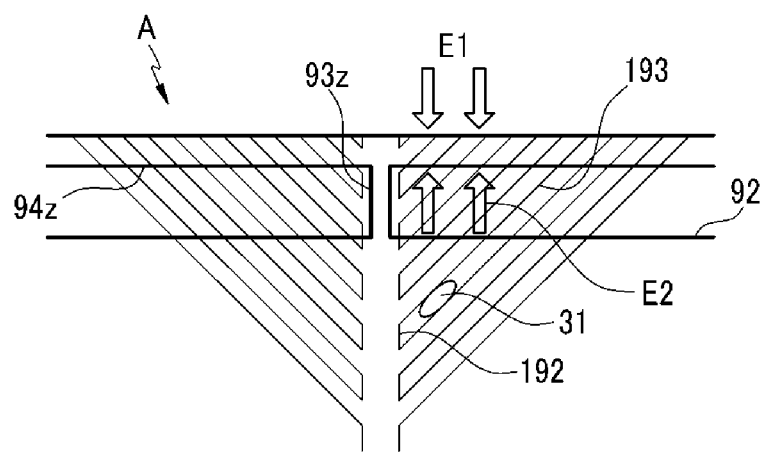
FIG. 3 is an enlarged view of the portion A of FIG. 1.
Figure 4:
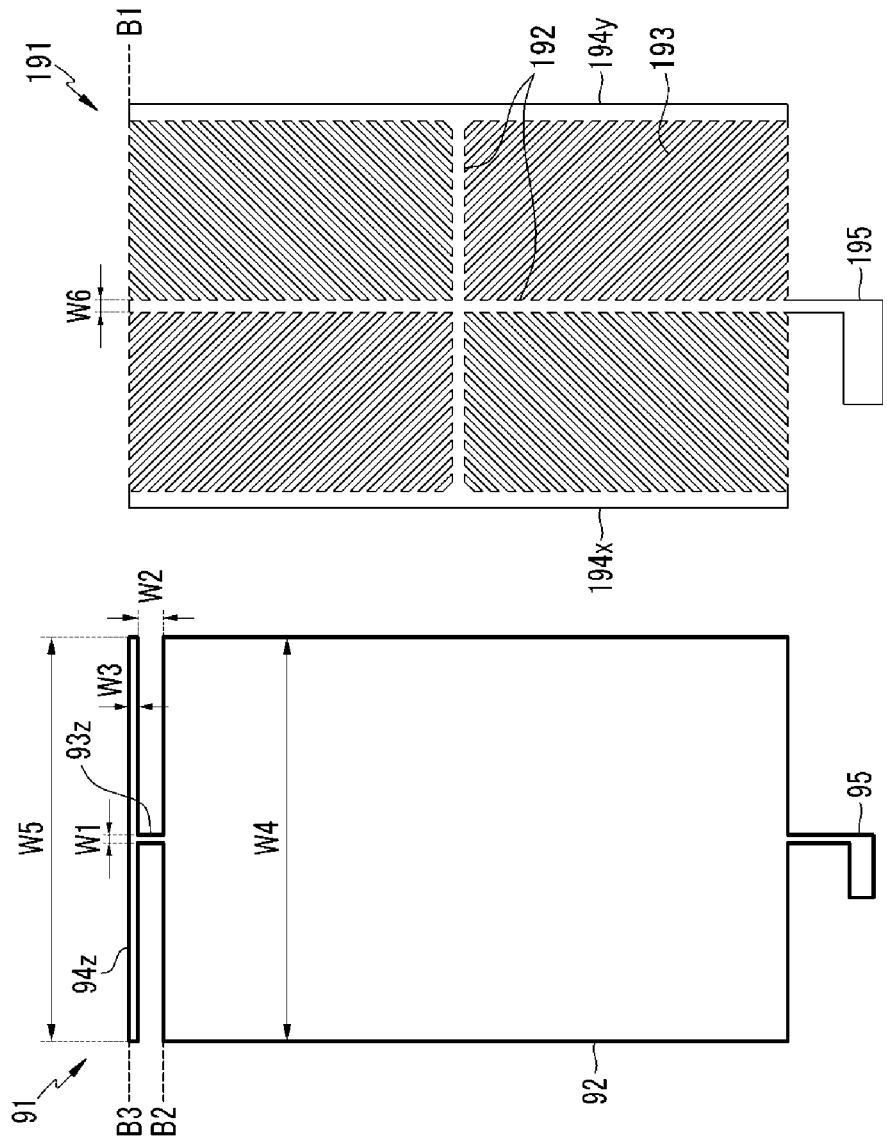
FIG. 4 is a top plan view respectively showing a lower pixel electrode and an upper pixel electrode of the liquid crystal display of FIG. 1.
Figure 5:
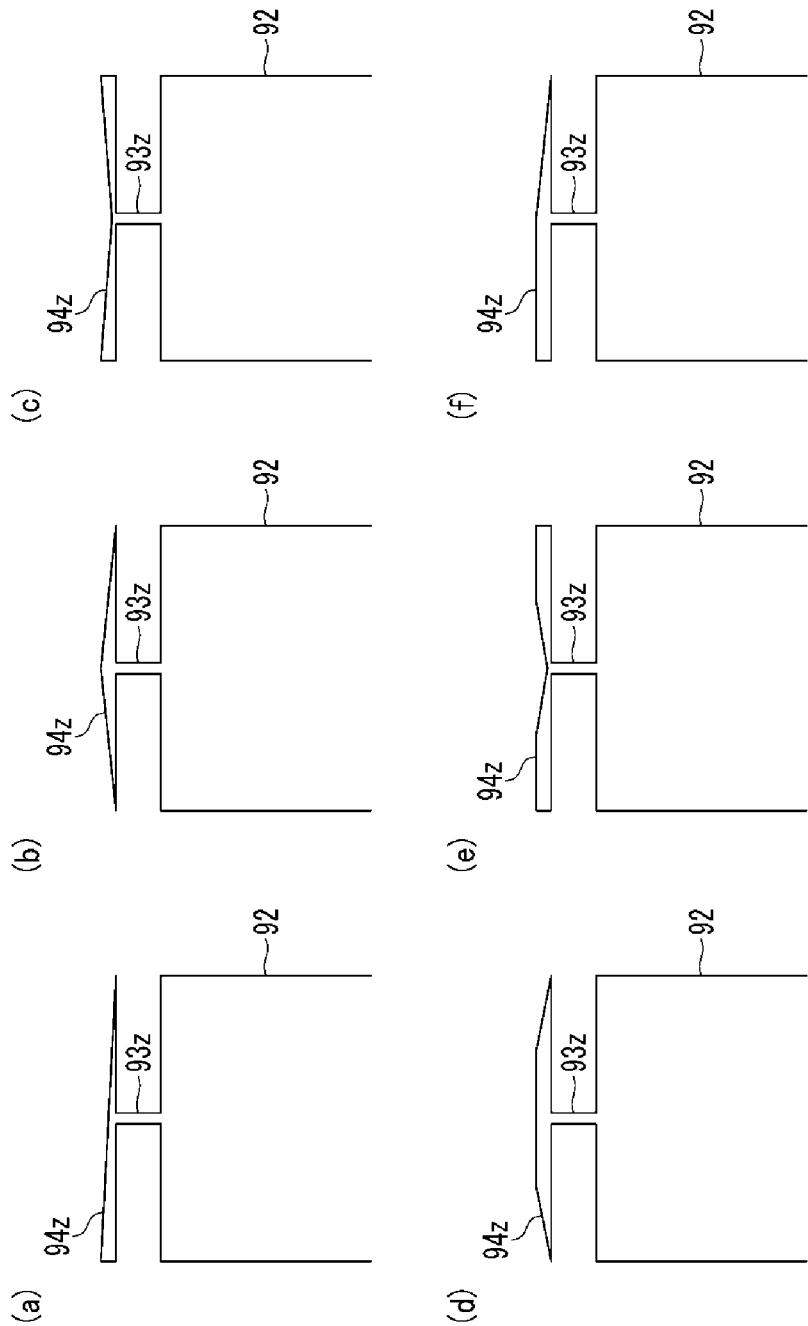
FIG. 5 is a view of various shapes of a lower pixel electrode of a liquid crystal display according to an exemplary embodiment.
Figure 6:
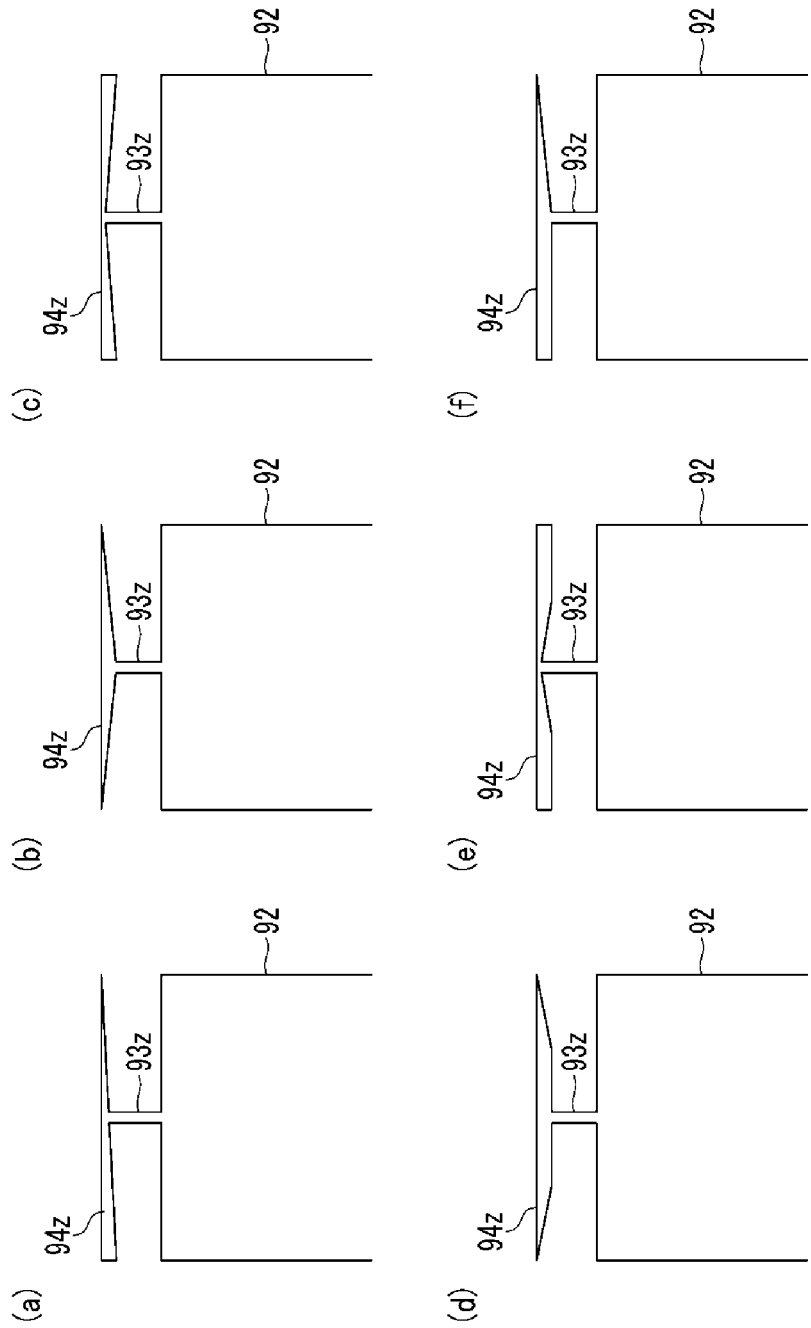
FIG. 6 is a view of various shapes of a lower pixel electrode of a liquid crystal display according to an exemplary embodiment.
Figure 7:
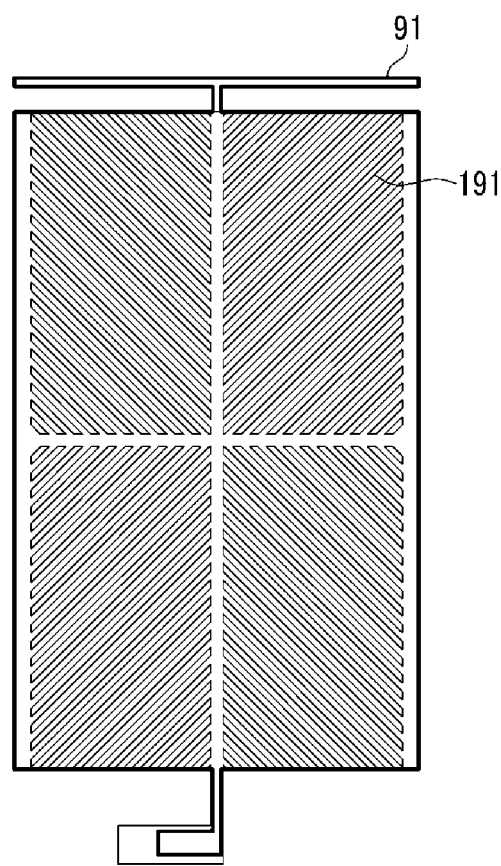
FIG. 7 is a layout view showing the lower pixel electrode and the upper pixel electrode of FIG. 4 together.

FIG. 1 is a layout view of one pixel of a liquid crystal display according to an exemplary embodiment, FIG. 2 is a cross-sectional view of the liquid crystal display of FIG. 1 taken along the line II-II, FIG. 3 is an enlarged view of the portion A of FIG. 1, FIG. 4 is a top plan view respectively showing a lower pixel electrode and an upper pixel electrode of the liquid crystal display of FIG. 1, FIG. 5 is a view of various shapes of a lower pixel electrode of a liquid crystal display according to an exemplary embodiment, FIG. 6 is a view of various shapes of a lower pixel electrode of a liquid crystal display according to an exemplary embodiment, and FIG. 7 is a layout view showing the lower pixel electrode and the upper pixel electrode of FIG. 4 together.

Referring to FIG. 1 and FIG. 2, a liquid crystal display according to an exemplary embodiment includes a lower panel 100 and an upper panel 200 facing each other, and a liquid crystal layer 3 interposed between the two display panels 100 and 200.

Firstly, the lower panel 100 will be described.

A plurality of gate lines 121 including gate electrodes 124 are formed on an insulation substrate 110. The gate lines 121 transmit gate signals and extend in a transverse direction.

A gate insulating layer 140 is formed on the gate lines 121, and a plurality of semiconductors 154 made of, for example, hydrogenated amorphous silicon or polysilicon are formed on the gate insulating layer 140.

Ohmic contacts 163 and 165 are formed on the semiconductors 154.

A plurality of data lines 171 and a plurality of drain electrodes 175 are formed on the ohmic contacts 163 and 165 and the gate insulating layer 140.

The data lines 171 transmit data signal and extend in a mainly longitudinal direction thereby intersecting the gate lines 121. The data lines 171 each include a source electrode 173 extending toward the gate electrode 124.

The drain electrode 175 is separated from the data line 171 and includes a portion facing the source electrode 173.

The ohmic contacts 163 and 165 are only disposed between the underlying semiconductor 154 and the overlying data line 171 and drain electrode 175, thereby reducing contact resistance therebetween. The semiconductor 154 includes a portion that is not covered and is exposed by the data line 171 and the drain electrode 175 at a portion between the source electrode 173 and the drain electrode 175.

The gate electrode 124, the source electrode 173, and the drain electrode 175 form a thin film transistor along with the semiconductor 154, and a channel of the thin film transistor is formed in the semiconductor 154 between the source electrode 173 and the drain electrode 175.

A first passivation layer 180a made of an insulating material is formed on the data line 171, the drain electrode 175, and the exposed semiconductor 154. The first passivation layer 180a has a contact hole 185a that exposes the drain electrode 175.

A plurality of lower pixel electrodes 91 are formed on the first passivation layer 180a.

Referring to FIG. 4, the lower pixel electrode 91 includes a main body 92, a bar-shaped portion 94z, and at least one connector 93z.

The main body 92 is an electrode having a plate shape and overlaps, via the insulating layer, a plurality of minute branches 193 of an upper pixel electrode 191 that will be described below. A shape of the main body 92 is an approximate rectangular, however it is not limited thereto. A length W4 of the main body 92 in the horizontal direction may be determined according to design conditions of the liquid crystal display. The plate shape of the main body 92 is intact and does not include slits. A protrusion 95 protruded for connection with other layers may be formed at a lower end of the main body 92. The protrusion 95 of the lower pixel electrode 91 is electrically connected to the drain electrode 175 through the contact hole 185a.

The bar-shaped portion 94z is an electrode having a bar shape that extends in either the horizontal direction (as shown in FIG. 4) or the vertical direction, and faces an edge of the main body 92. The bar-shaped portion 94z may extend with either a variable or constant (as shown in FIG. 4) gap with the edge of the main body 92. FIG. 4 is an example in which the bar-shaped portion 94z extends along the horizontal direction and extends parallel to the upper edge B2 of the main body 92. The length W5 of the bar-shaped portion 94z is equal to or more than ½ of the length W4 at the edge of the main body 92 facing the bar-shaped portion 94z. The width W3 of the bar-shaped portion 94z may be larger than 0 and less than about 10 μm. The width W3 of the bar-shaped portion 94z may be constant or may change along the length direction.

The shape of the bar-shaped portion 94z is not limited to the rectangle as shown in FIG. 4, and may be modified, and various examples of the bar-shaped portion 94z are shown in FIG. 5 and FIG. 6. In detail, FIG. 5 shows an example in which the inner edge of the bar-shaped portion 94z that faces the edge of the main body 92 is parallel to the edge of the main body 92 facing the bar-shaped portion 94z, and FIG. 6 shows an example in which the outer edge of the bar-shaped portion 94z is parallel to the edge of the main body 92 facing the bar-shaped portion 94z. For reference, the side of the bar-shaped portion 94z toward the interior of the main body 92 of the lower pixel electrode 91 (nearest the edge of the main body 92) is hereinafter referred to as the inside, or inner edge, and the side of the bar-shaped portion 94z toward the exterior of the main body 92, opposite the inside, is hereinafter referred to as the outside, or outer edge. For instance, in FIG. 4, the edge of the main body 92 facing the bar-shaped portion is marked B2 and the outer edge is marked B3. The inner edge is not marked.

FIG. 5 (a) is an example of a right triangle shape of the bar-shaped portion 94z. An acute angle between the outer edge and the inner edge of the bar-shaped portion 94z may be disposed at the right side as shown in FIG. 5 (a), or alternatively may be disposed at the left side.

FIG. 5 (b) and FIG. 5 (c) are examples in which the bar-shaped portion 94z is formed of two right triangles that are symmetrical with respect to a longitudinal line. As shown in FIG. 5 (b), the vertices of two right triangles forming the right angle may meet each other, or the vertices of two right triangles forming the acute angle may meet each other as shown in FIG. 5 (c).

FIG. 5 (d) and FIG. 5 (e) show examples in which the bar-shaped portion 94z is made of two trapezoids that are symmetrical with reference to the longitudinal line. Particularly, the bar-shaped portion 94z of the exemplary embodiments shown in FIG. 5 (d) and FIG. 5 (e) includes the vertex forming the right angle. As shown in FIG. 5 (d), the vertexes of two right trapezoids forming the right angle may face each other and be spaced apart along the length of the bar-shaped portion 94z, and the vertices of two right trapezoids forming the acute angle may meet each other as shown in FIG. 5 (e).

FIG. 5 (f) shows an example of the bar-shaped portion 94z formed as one trapezoid. The vertex of the trapezoid forming the acute angle may be positioned at the right side as shown in FIG. 5 (f), or alternatively may be positioned at the left side. Also, the bar-shaped portion 94z may have various shapes.

The connector 93z electrically connects the main body 92 and the bar-shaped portion 94z to each other. The number of connectors 93z and the position of the connector 93z are not limited to FIG. 4, and connector 93z may be formed with various numbers and in various positions. For example, the connector 93z may be positioned at the left edge or the right edge of the main body 92 and the bar-shaped portion 94z. The length W2 (FIG. 4) of the connector 93z, that is, a distance W2 between the main body 92 and the bar-shaped portion 94z, is larger than 0, and the main body 92 and the bar-shaped portion 94z are separated from each other except at the connector 93z. The width W1 of the connector 93z may be larger than 0 and may be less than about a sum of the width of the longitudinal stem of an upper pixel electrode 191 that will be described later and about 1 μm.

The lower pixel electrode 91 may be formed of a transparent conductive material such as ITO (indium tin oxide) or IZO (indium zinc oxide) or a reflective metal such as aluminum, silver, chromium, or alloys thereof.

A second passivation layer 180b (FIG. 2) made of the insulating material is formed on the lower pixel electrode 91. The second passivation layer 180b may have a thickness of less than 3.5 μm, and a dielectric ratio thereof may have a value of between about 1.5 and 8.5. The second passivation layer 180b has a contact hole 185b overlapping the contact hole 185a of the first passivation layer 180a and exposing at least one of the drain electrode 175 and the lower pixel electrode 91. The edges of two contact holes 185a and 185b may approximately line up with each other.

The upper pixel electrode 191 is positioned on the second passivation layer 180b.

The upper pixel electrode 191 is rectangular and includes a stem 192 (FIG. 4), a plurality of minute branches 193 outwardly extending from the stem 192, connection branches 194x and 194y connecting ends of at a least portion of the minute branches 193, and a protrusion 195.

The stem 192 may include a transverse stem and a longitudinal stem crossing each other. The width W6 of the stem 192 may be larger than a value of the width W1 of the connector 93z of the lower pixel electrode 91 from which about 1 μm is subtracted (i.e., W6>(W1−(≈1 μm)), and thus the width W1 of the connector 93z is larger than zero and less than a sum of the width W6 of the stem plus 1 μm (i.e., 0<W1<(W6+(≈1 μm)).

The upper pixel electrode 191 is divided into a plurality of sub-regions by the stems 192, for example four sub-regions. The direction in which the plurality of minute branches 193 extends is different at each sub-region. In detail, the minute branches 193 of the sub-region positioned in the right upper quadrant obliquely extend from the stem 192 in the right upper direction, the minute branches 193 of the sub-region positioned at the right lower quadrant obliquely extend from the stem 192 in the right lower direction, the minute branches 193 of the sub-region positioned at the left upper quadrant obliquely extend from the stem 192 in the left upper direction, and the minute branches 193 of the sub-region positioned at the left lower quadrant obliquely extend from the stem 192 in the left lower direction. The extending direction of the minute branches 193 makes an angle of about 45° with the extending direction of the gate line 121 or the transverse stem or the longitudinal stem.

The connection branches 194x and 194y may connect the ends of at least a portion of the minute branches along the edges of upper pixel electrode 191 that are not in a position corresponding to the position of an edge facing the bar-shaped portion 94z of the lower pixel electrode 91 (for instance, not along edge B1 in FIG. 4). Accordingly, in the present exemplary embodiment, the connection branches 194x and 194y may be positioned along the edges of the upper pixel electrode 191 except for the upper edge. In detail, the connection branch 194x connects the ends of the minute branches 193 obliquely extending in the left direction, and it extends in the vertical direction thereby forming the left edge of the upper pixel electrode 191. The connection branch 194y connects the ends of the minute branches 193 obliquely extending in the right direction, and it extends in the vertical direction thereby forming the right edge of the upper pixel electrode 191.

Differently from FIG. 4, the upper pixel electrode 191 may further include a connection branch (not shown) connecting the ends of the minute branches 193 obliquely extending in the lower direction and extending in the horizontal direction thereby forming the lower end of the upper pixel electrode 191.

At least one of the connection branches 194x and 194y may be omitted.

Also, it is preferable that the ends of the minute branches 193 of the upper pixel electrode 191 positioned along the side corresponding to side in which the bar-shaped portion 94z of the lower pixel electrode 91 is positioned (e.g., the minute branches 193 positioned at edge B1 in FIG. 4) are not connected to each other. For example, referring to FIG. 4, when the lower pixel electrode 91 includes the bar-shaped portion 94z at the upper end, at the upper edge of the upper pixel electrode 191 corresponding thereto, a configuration such as the connection branch connecting the ends of the minute branches 193 may not be included.

The protrusion 195 for connection with other layers may be protruded from the lower end of the longitudinal stem of the stem 192 to the lower side. The protrusion 195 of the upper pixel electrode 191 is electrically connected to at least one of the drain electrode 175 and the lower pixel electrode 91 through the contact hole 185b.

The upper pixel electrode 191 may also be made of a transparent conductive material such as ITO or IZO or a reflective metal such as aluminum, silver, chromium, or alloys thereof.

Next, the upper panel 200 (FIG. 2) will be described.

A light blocking member 220 and a color filter 230 are formed on an insulation substrate 210. Each color filter 230 may display one of primary colors such as three primary colors of red, green, and blue.

An overcoat 250 may be formed on the color filter 230 and the light blocking member 220, and an opposing electrode 270 is formed on the entire surface of the substrate on the overcoat 250. The opposing electrode 270 may be formed as a plate to face a plurality of lower and upper pixel electrodes 91 and 191.

Alignment layers 11 and 21 are respectively positioned on inner surfaces of the display panel 100 and 200, and they may be vertical alignment layers.

A polarizer (not shown) is provided on the outer surface of the display panels 100 and 200, the polarization axis of the two polarizers may be crossed, and one polarization axis of them is preferably parallel to the gate line 121. In a case of the reflective liquid crystal display, one of the two polarizers may be omitted.

A liquid crystal layer 3 is positioned between the two display panels 100 and 200, and includes liquid crystal molecules 31 having negative dielectric anisotropy. The liquid crystal molecules 31 may have a pretilt, in which the liquid crystal molecule 31 is tilted without application of an electric field, such that the long axes thereof are oriented approximately parallel to the length direction (the extending direction) of the minute branches 193 of the upper pixel electrode 191. The liquid crystal molecules 31 may be aligned to be vertical with respect to the surface of the display panels 100 and 200 in a state that an electric field is not applied to the liquid crystal layer 3. Also, the liquid crystal layer 3 may further include an alignment assistance agent including a reactive mesogen such that the liquid crystal molecules 31 may have the pretilt as a result of the alignment assistance agent such that the long axes thereof are approximately parallel to the length direction of the minute branches 193.

In another exemplary embodiment, the alignment assistance agent may be included in the alignment layers 11 and 21. The alignment layers 11 and 21 include a main chain and a side chain, and the alignment assistance agent forms the side chain of the alignment layer 11 and 21 and may have negative dielectric anisotropy. The liquid crystal molecules 31 may have a pretilt so that they are oriented approximately parallel to the length direction of the minute branches 193 by the side chain.

Next, an operation of the liquid crystal display according to an exemplary embodiment will be described.

When a signal is applied to the gate line 121, the switching element of the thin film transistor connected to the gate line 121 is turned on. Thus, a data voltage, which is applied to the data line 171, is applied to the lower pixel electrode 91 and the upper pixel electrode 191 through the turned-on switching element. The lower and upper pixel electrodes 91 and 191 applied with the data voltage along with a predetermined voltage such as a common voltage Vcom applied to the opposing electrode 270 generate an electric field in the liquid crystal layer 3. Thus, the orientations of the liquid crystal molecules 31 of the liquid crystal layer 3 are changed such that their direction is parallel to the direction of the electric field in response to the electric field. In this case, the orientation of the liquid crystal molecules is approximately vertical with respect to the plane of the substrates.

The lower pixel electrode 91 and the opposing electrode 270 may form the vertical electric field in the liquid crystal layer 3 such that the electric field between the minute branches 193 adjacent to the upper pixel electrode 191 is distorted thereby forming a fringe field. The liquid crystal molecules 31 are arranged in a predetermined direction by the fringe field, and resultantly they are inclined in the direction approximately parallel to the length direction of the minute branches 193. When the polarization axis of the polarizer attached to the outer surface of the lower panel 100 and the polarization axis of the polarizer attached to the outer surface of the upper panel 200 are respectively in about a horizontal direction and a vertical direction, and the liquid crystal molecules 31 are arranged parallel to the length direction of the minute branches 193, the display displays the brightest white.

Referring to FIG. 3, for the portion of upper pixel 191 where the ends of the minute branches 193 are not connected to each other, the horizontal component E1 of the fringe field formed between the upper edge of the minute branches 193 and the opposing electrode 270 is approximately perpendicular to the edge of the minute branches 193. The horizontal component E2 of the fringe field formed between the inner edge of the bar-shaped portion 94z of the lower pixel electrode 91 and the opposing electrode 270 is approximately perpendicular to the lower edge of the bar-shaped portion 94z and is opposite to the direction of the horizontal component E1 of the fringe field formed by the minute branches 193. Accordingly, the horizontal component E1 of the fringe field by the edge of the minute branches 193 and the horizontal component E2 of the fringe field by the inner edge of the bar-shaped portion 94z may be offset to each other. Also, the bar-shaped portion 94z of the lower pixel electrode 91 may block an external electric field. Accordingly, the bar-shaped portion 94z of the lower pixel electrode 91 may prevent the liquid crystal molecules 31 from not being arranged approximately parallel to the length direction of the minute branches 193 such that the arrangement direction is scattered. Accordingly, the transmittance may be increased in the edge portion of the lower and upper pixel electrodes 91 and 191.

As described above, the horizontal components of the fringe field are offset along the edge of the lower and upper pixel electrodes 91 and 191 to effectively increase the transmittance, as shown in FIG. 1, FIG. 3, FIG. 4, and FIG. 7, and it is preferable that the edge B1 of the upper pixel electrode 191 is not disposed outside the outer edge B3 of the bar-shaped portion 94z of the lower pixel electrode 91 on the plane, and also is not inside the edge B2 of the main body facing the bar-shaped portion 94z. In other words, when the edge B1 along the ends of the minute branches 193 of the upper pixel electrode 191 facing the bar-shaped portion 94z of the lower pixel electrode 91 is arranged to align with the outer edge B3 of the bar-shaped portion 94z of the lower pixel electrode 91 or the edge B2 of the main body 92 facing the bar-shaped portion 94z or is positioned therebetween, the transmittance at the edge of the lower and the upper pixel electrodes 91 and 191 may be further improved. FIG. 1 shows an example in which the outer edge B3 of the bar-shaped portion 94z of the lower pixel electrode 91 is arranged to align with the edge B1 connecting the upper ends of the minute branches 193 of the upper pixel electrode 191, and FIG. 7 shows an example in which the upper edge B2 of the main body 92 facing the bar-shaped portion 94z of the lower pixel electrode 91 is arranged to align with the edge B1 connecting the ends of the minute branches 193 of the upper pixel electrode 191.

However, in an exemplary embodiment, the end of the minute branches 193 of the upper pixel electrode 191 facing the bar-shaped portion 94z of the lower pixel electrode 91 may emerge from the outer edge B3 of the bar-shaped portion 94z of the lower pixel electrode 91 or may be positioned inside the edge B2 of the main body 92 facing the bar-shaped portion 94z. In this case, as a distance that the ends of the minute branches 193 of the upper pixel electrode 191 facing the bar-shaped portion 94z of the lower pixel electrode 91 deviate from the outer edge B3 of the bar-shaped portion 94z of the lower pixel electrode 91 or the edge B2 of the main body 92 is decreased, the transmittance may be increased along the edge of the lower and upper pixel electrodes 91 and 191.

Next, the lower electrode and the upper pixel electrode according to various exemplary embodiments of the liquid crystal display will be described with reference to FIG. 8 to FIG. 16 as well as the above-described drawings. Like reference numerals designate like elements in the embodiments, and repetitive description will be omitted.

Figure 8:
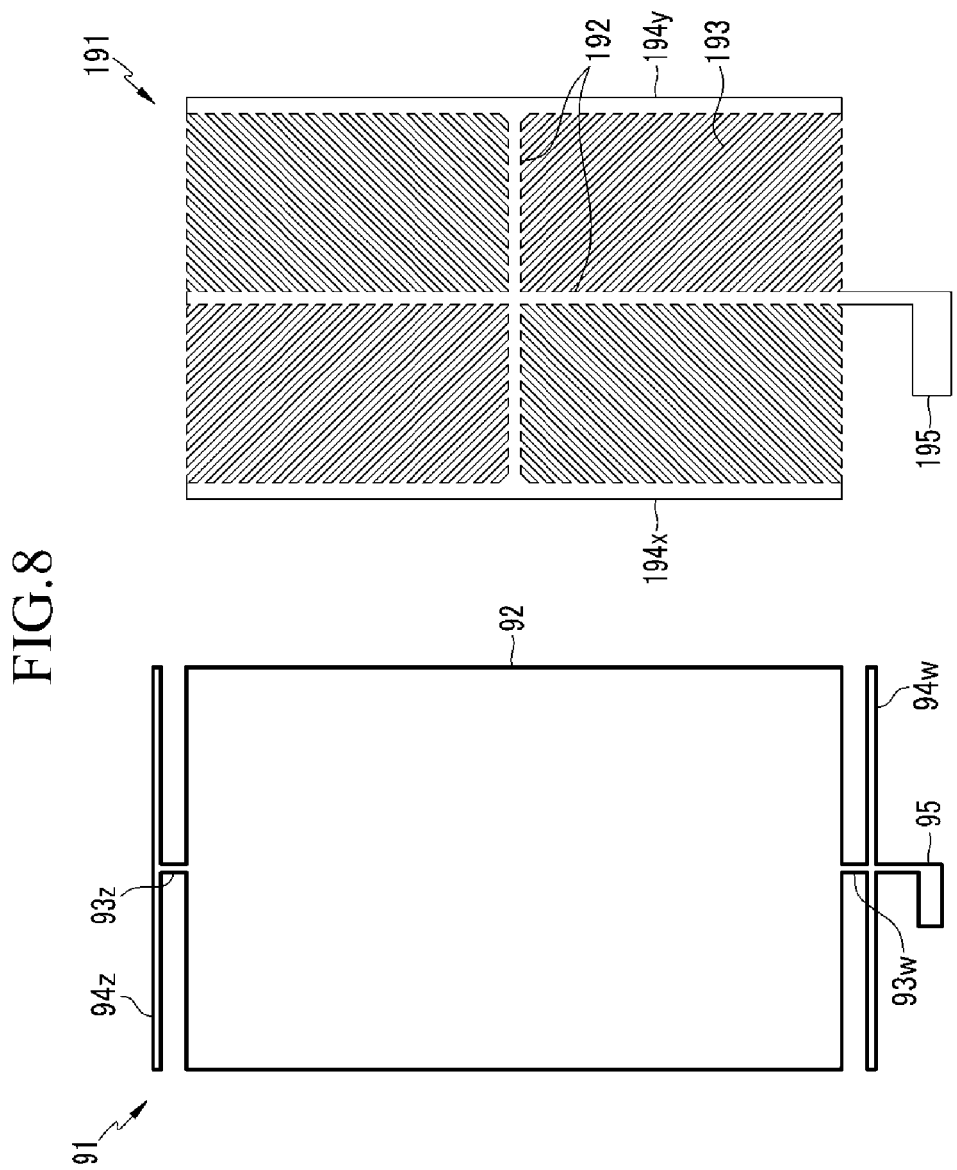
FIG. 8 is a top plan view respectively showing a lower pixel electrode and an upper pixel electrode according to an exemplary embodiment.
Figure 9:
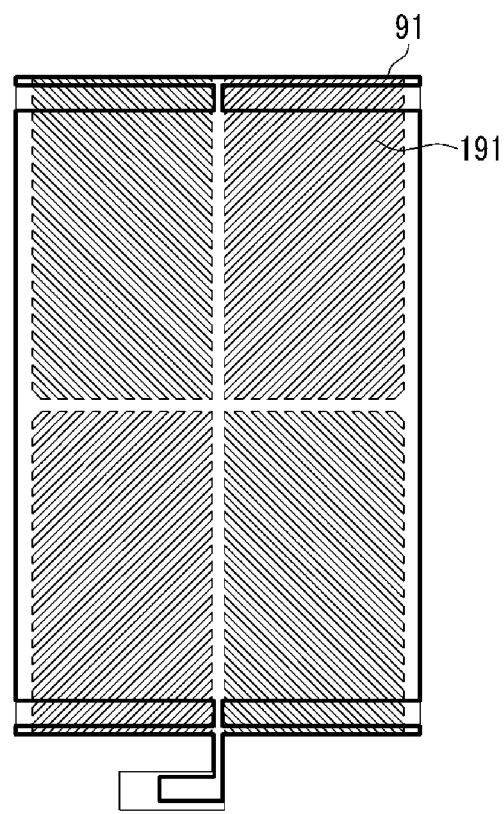
FIG. 9 and FIG. 10 are layout views showing the lower pixel electrode and the upper pixel electrode of FIG. 8 together.
Figure 10:
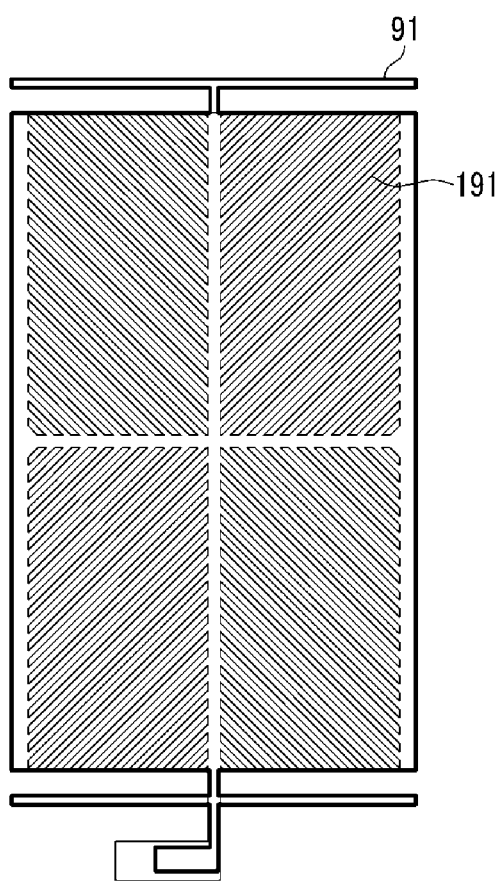

FIG. 8 is a top plan view respectively showing a lower pixel electrode and an upper pixel electrode according to an exemplary embodiment, and FIG. 9 and FIG. 10 are layout views showing the lower pixel electrode and the upper pixel electrode of FIG. 8 together.

Referring to FIG. 8, the lower pixel electrode 91 of the liquid crystal display according to the present exemplary embodiment is the same as most of the exemplary embodiment shown in FIG. 4, however it further includes a bar-shaped portion 94w connected through a connection 93w at the lower end of the main body 92. The protrusion 95 may protrude from the bar-shaped portion 94w. The lower bar-shaped portion 94w may be approximately symmetrical to the upper bar-shaped portion 94z with respect to the main body 92. Also, the various dimensions, arrangements, and shapes of the bar-shaped portion 94w and the connection 93w can be the same as those of the above-described bar-shaped portion 94z and connection 93z, such that the detailed description is omitted.

Also, the upper pixel electrode 191 of the liquid crystal display according to the present exemplary embodiment is the same as in the exemplary embodiment shown in FIG. 4 such that the detailed description is omitted.

The lower pixel electrode 91 and the upper pixel electrode 191 according to the present exemplary embodiment overlap each other via the second passivation layer 180b, and the upper end and the lower end of the upper pixel electrode 191 may be arranged to align with the outer edge of the bar-shaped portion 94z and 94w of the lower pixel electrode 91 or the edge of the main body 92 facing the bar-shaped portions 94z and 94w, or may be positioned therebetween. FIG. 9 is an example in which the outer edge of the bar-shaped portions 94w and 94z of the lower pixel electrode 91 is arranged to align with the lower end and the upper end, respectively, of the upper pixel electrode 191, and FIG. 10 is an example in which the edge of the main body 92 facing the bar-shaped portions 94w and 94z of the lower pixel electrode 91 is arranged to align with the upper end and the lower end, respectively, of the upper pixel electrode 191.

Figure 11:
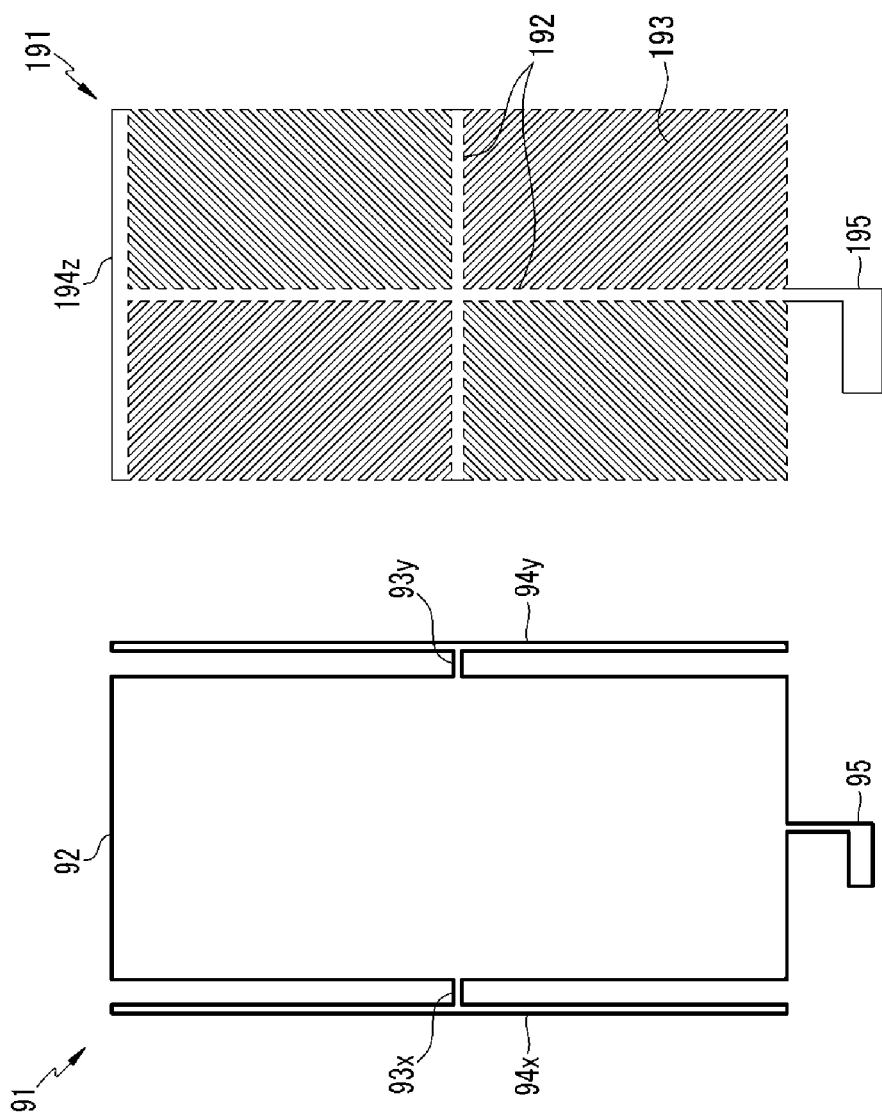
FIG. 11 is a top plan view respectively showing a lower pixel electrode and an upper pixel electrode according to an exemplary embodiment.
Figure 12:
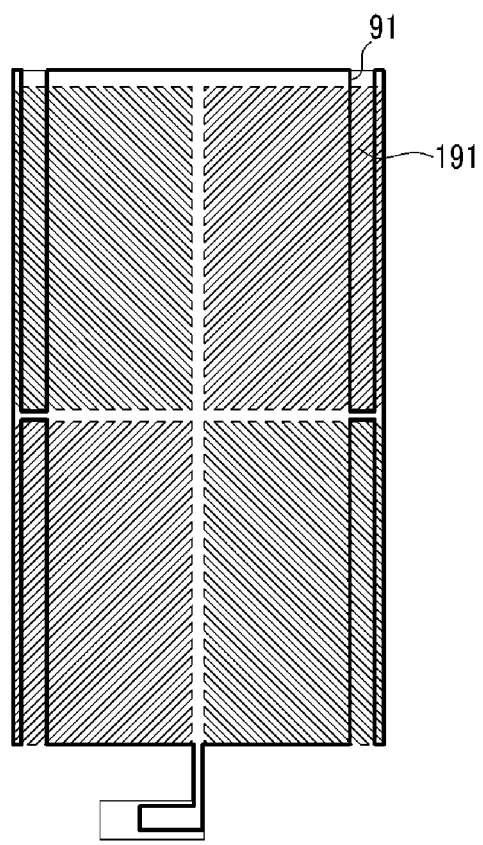
FIG. 12 and FIG. 13 are layout views showing the lower pixel electrode and the upper pixel electrode of FIG. 11 together.
Figure 13:
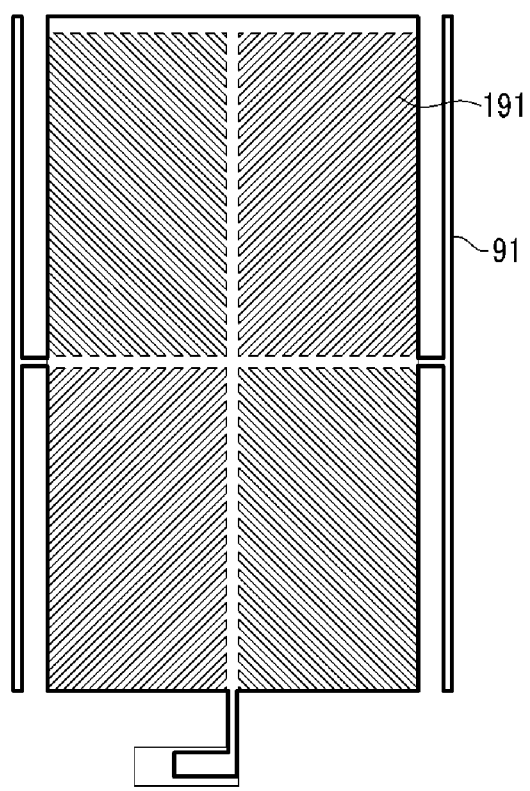

FIG. 11 is a top plan view respectively showing a lower pixel electrode and an upper pixel electrode according to an exemplary embodiment, and FIG. 12 and FIG. 13 are layout views showing the lower pixel electrode and the upper pixel electrode of FIG. 11 together.

Referring to FIG. 11, the lower pixel electrode 91 of the liquid crystal display according to the present exemplary embodiment is the same as most of the exemplary embodiment shown in FIG. 4, however the bar-shaped portion is not positioned along the upper side and the lower side of the main body 92, but along the left side or the right side. That is, the lower pixel electrode 91 may include a main body 92, a bar-shaped portion 94x connected to the main body 92 through the left connection 93x, or a bar-shaped portion 94y connected to the main body 92 through the right connection 93y.

The two bar-shaped portions 94x and 94y may be symmetrical with respect to each other and with respect to the main body 92. Also, the various dimensions, arrangements, and shapes of the bar-shaped portions 94x and 94y and the connections 93x and 93y can be the same as those previously described for the bar-shaped portion 94z and the connection 93z such that the detailed description is omitted.

Further, the upper pixel electrode 191 of the liquid crystal display according to the present exemplary embodiment is the same as most of the upper pixel electrode 191 shown in FIG. 4, however connection branches 194z connecting the ends of the minute branches 193 at the upper end of the upper pixel electrode 191 are further included and there are no left or right connection branches of the upper pixel electrode 191 shown in FIG. 4. The lower pixel electrode 91 includes the bar-shaped portions 94x and 94y positioned at the left side and the right side of the main body 92 such that the connection branches connecting the ends of the left and right minute branches 193 of the upper pixel electrode 191 are not necessary. Also, in the present exemplary embodiment, the connection branches 194z positioned on the upper pixel electrode 191 may be omitted.

The lower pixel electrode 91 and the upper pixel electrode 191 according to the present exemplary embodiment overlap each other via the second passivation layer 180b, and the left edge and the right edge of the upper pixel electrode 191 may be arranged to align with the outer edge of the bar-shaped portions 94x and 94y, respectively, of the lower pixel electrode 91 or the edge of the main body 92 facing the bar-shaped portions 94x and 94y, respectively, or may be positioned therebetween. FIG. 12 shows an example in which the outer edge of the bar-shaped portion 94x and 94y of the lower pixel electrode 91 is arranged to align with the left edge or the right edge, respectively, of the upper pixel electrode 191, and FIG. 13 shows an example in which the edge of the main body 92 facing the bar-shaped portion 94x and 94y of the lower pixel electrode 91 is arranged to align with the left edge and the right edge, respectively, of the upper pixel electrode 191.

Figure 14:
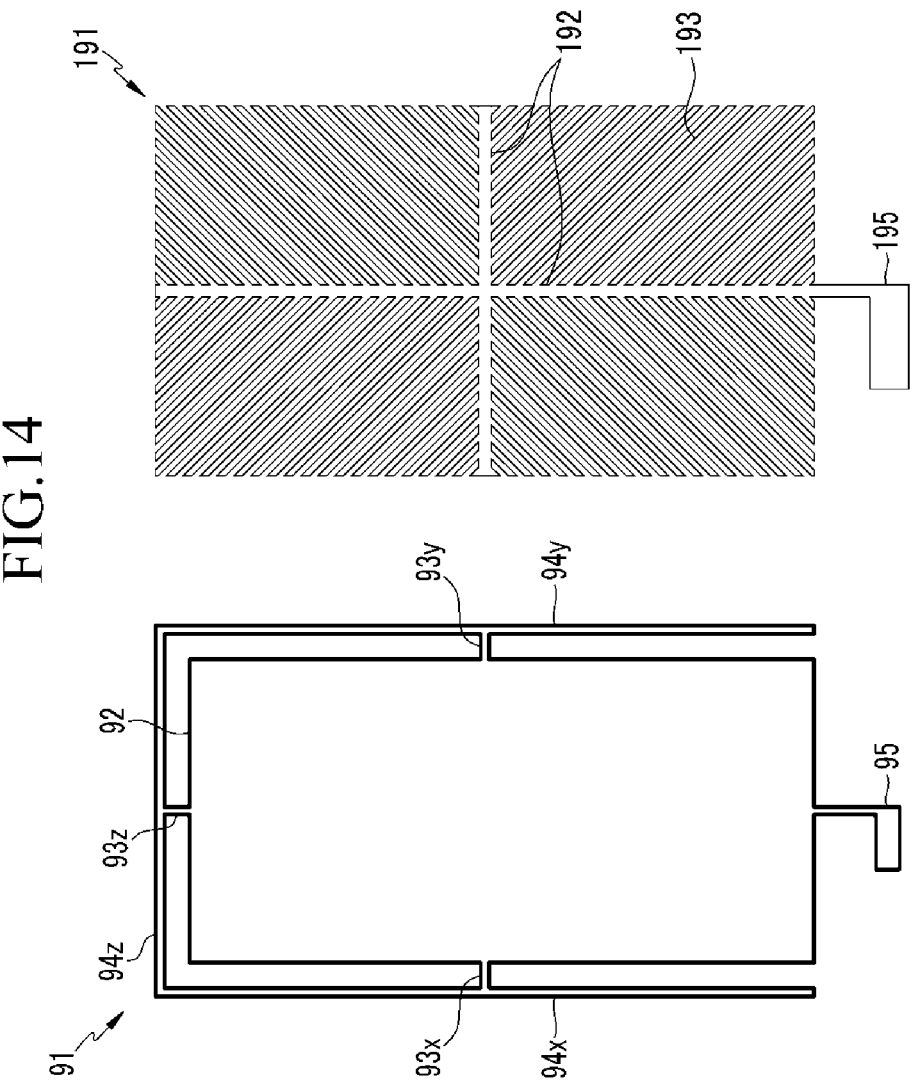
FIG. 14 is a top plan view respectively showing a lower pixel electrode and an upper pixel electrode according to an exemplary embodiment.
Figure 15:
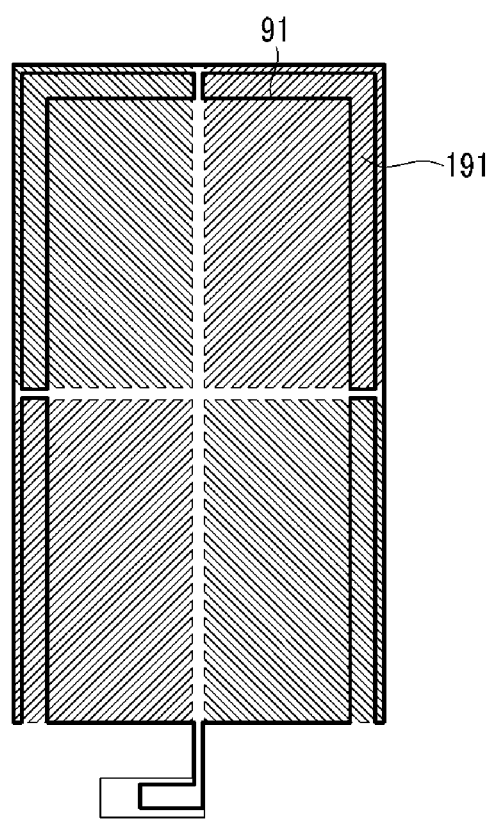
FIG. 15 and FIG. 16 are layout views showing the lower pixel electrode and the upper pixel electrode of FIG. 14 together.
Figure 16:
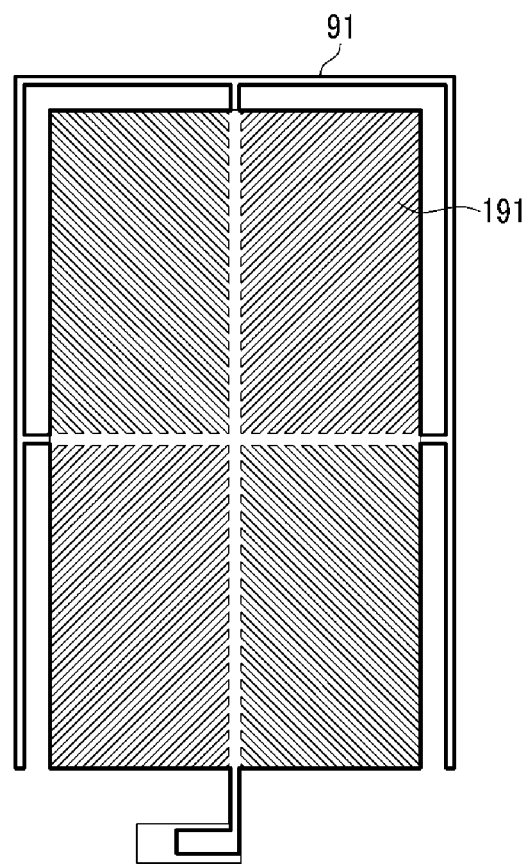

FIG. 14 is a top plan view respectively showing a lower pixel electrode and an upper pixel electrode according to an exemplary embodiment of the present invention, and FIG. 15 and FIG. 16 are layout views showing the lower pixel electrode and the upper pixel electrode of FIG. 14 together.

Referring to FIG. 14, the lower pixel electrode 91 of the liquid crystal display according to the present exemplary embodiment includes features of the exemplary embodiments shown in both FIG. 4 and FIG. 11. That is, the lower pixel electrode 91 may include a main body 92, a bar-shaped portion 94x connected to the main body 92 through the left connection 93x, a bar-shaped portion 94y connected to the main body 92 through the right connection 93y, and a bar-shaped portion 94z connected to the main body 92 through the upper connection 93z. Alternatively, only one or two of the left connection 93x, the right connection 93y, and the upper connection 93z may exist.

Also, the upper pixel electrode 191 of the liquid crystal display according to the present exemplary embodiment is the same as most of the upper pixel electrode 191 shown in FIG. 11, however the connection branch connecting the ends of the upper minute branches 193 of the upper pixel electrode 191 may be omitted. The lower pixel electrode 91 includes the bar-shaped portions 94x, 94y, and 94z of the left side, the right side, and the upper side, respectively, such that the connection branch connecting the ends of the minute branches 193 of the upper pixel electrode 191 is not necessary. In contrast, a connection branch (not shown) connecting the ends of the minute branches 193 positioned at the lower end of the upper pixel electrode 191 may be added.

The lower pixel electrode 91 and the upper pixel electrode 191 according to the present exemplary embodiment overlap each other via the second passivation layer 180b, and the left, right, and upper edges of the upper pixel electrode 191 may be arranged to align with the outer edge of the bar-shaped portions 94x, 94y, and 94z, respectively, of the lower pixel electrode 91 or the edge of the main body 92 facing the bar-shaped portions 94x, 94y, and 94z, respectively. FIG. 15 shows an example in which the outer edge of the bar-shaped portions 94x, 94y, and 94z of the lower pixel electrode 91 is arranged to align with the edge of the upper pixel electrode 191, and FIG. 16 shows an example in which the edge of the main body 92 facing the bar-shaped portion 94x, 94y, and 94z of the lower pixel electrode 91 is arranged to align with the edge of the upper pixel electrode 191.

Next, a liquid crystal display according to an exemplary embodiment will be described with reference to FIG. 17, FIG. 18, and FIG. 19.

Figure 17:
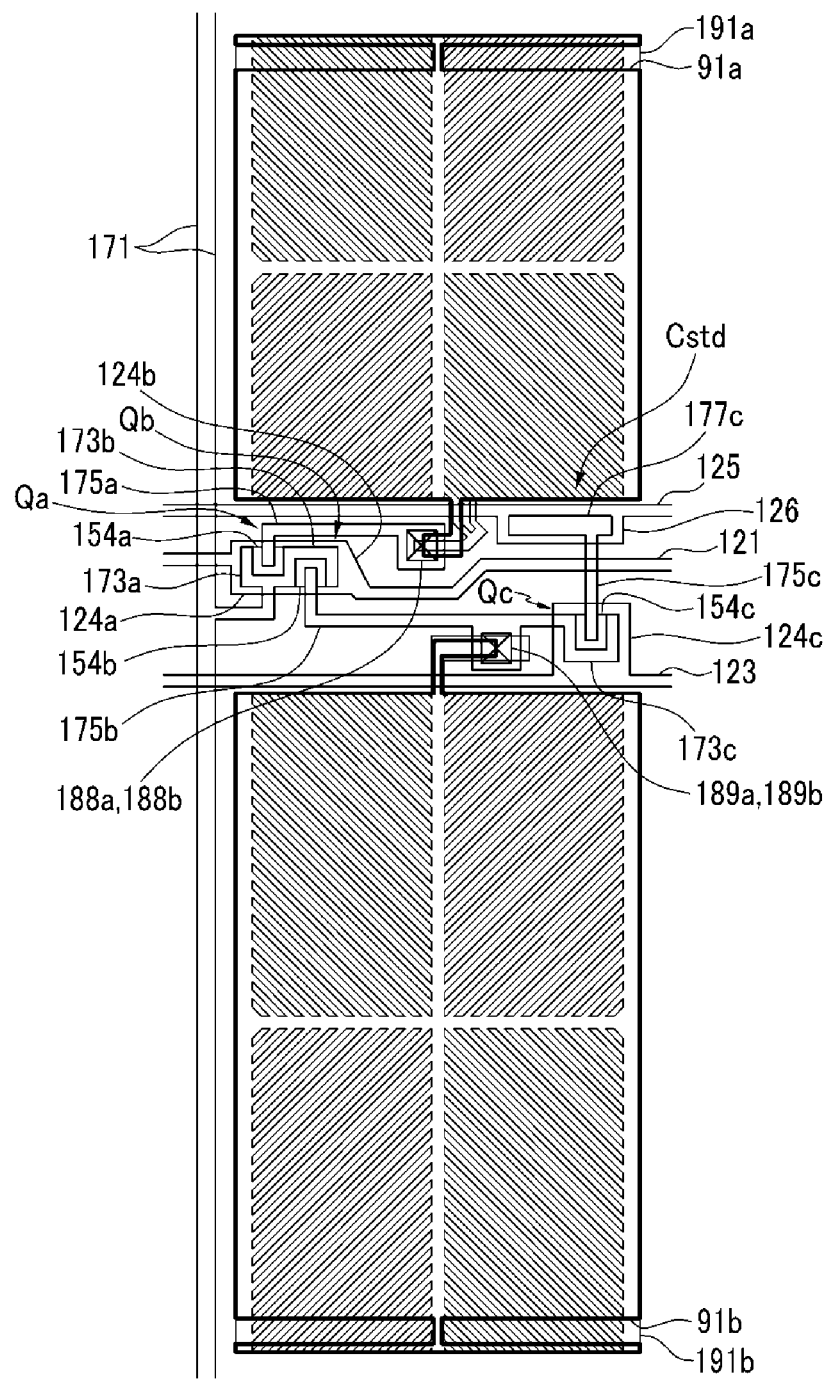
FIG. 17 is a layout view of one pixel of a liquid crystal display according to an exemplary embodiment.
Figure 18:
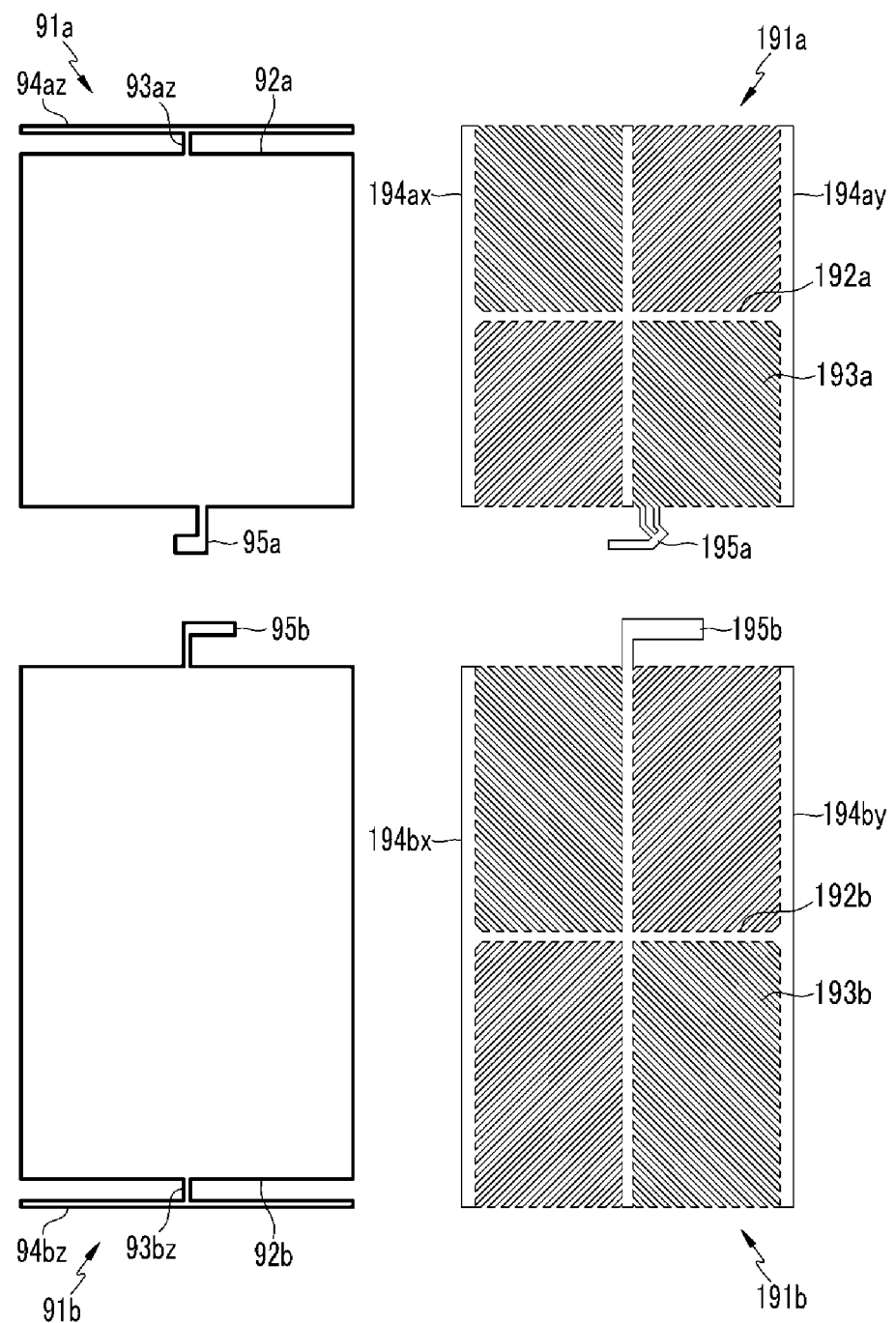
FIG. 18 is a top plan view of a lower pixel electrode and an upper pixel electrode of the liquid crystal display of FIG. 16.
Figure 19:
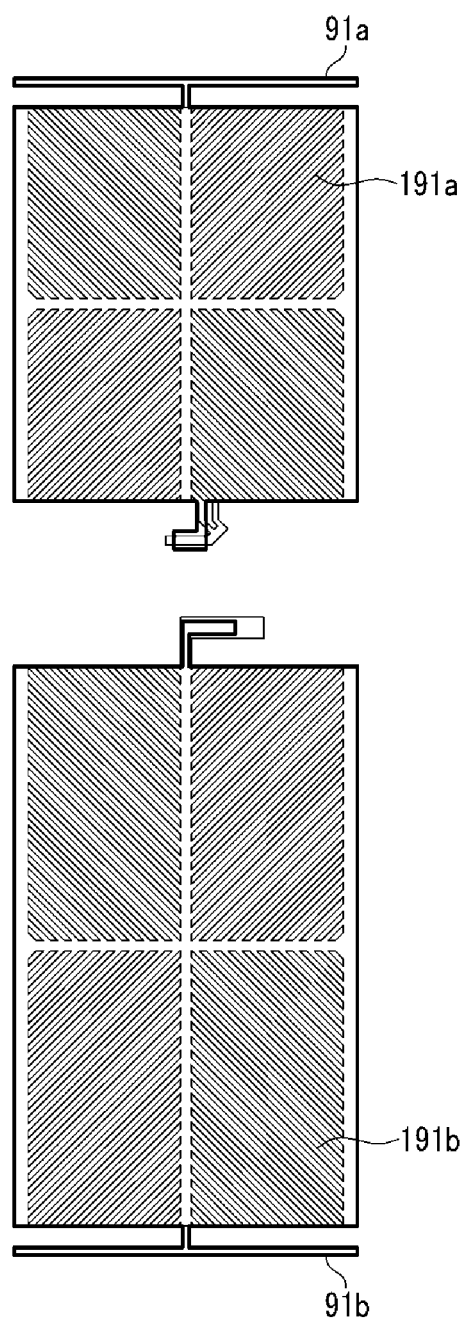
FIG. 19 is a layout view showing the lower pixel electrode and the upper pixel electrode of FIG. 18 together.

FIG. 17 is a layout view of one pixel of a liquid crystal display according to an exemplary embodiment, FIG. 18 is a top plan view of a lower pixel electrode and an upper pixel electrode of the liquid crystal display of FIG. 16, and FIG. 19 is a layout view showing the lower pixel electrode and the upper pixel electrode of FIG. 18 together.

The liquid crystal display according to the present exemplary embodiment has a similar cross-section to the liquid crystal display according to the exemplary embodiment shown in FIG. 1 to FIG. 7. Differences from the above-described exemplary embodiment will be described.

Referring to the lower panel, a plurality of gate conductors include a plurality of gate lines 121, a plurality of step-down gate lines 123, and a plurality of storage electrode lines 125 are formed on an insulation substrate 110.

The gate lines 121 and the step-down gate lines 123 extend in a mainly transverse direction and transmit gate signals. The gate line 121 includes a first gate electrode 124a and a second gate electrode 124b, and the step-down gate line 123 includes a third gate electrode 124c. The first gate electrode 124a and the second gate electrode 124b are connected to each other.

The storage electrode line 125 may extend mainly in the transverse direction and transmits a predetermined voltage such as a common voltage Vcom. The storage electrode line 125 may include a storage expansion 126 extending downward.

A gate insulating layer 140 is positioned on the gate conductor, and a plurality of semiconductor stripes (not shown) are formed thereon. The semiconductor stripes include first and second semiconductors 154a and 154b extending mainly in the longitudinal direction toward the first and second gate electrodes 124a and 124b and connected to each other, and a third semiconductor 154c connected to the second semiconductor 154b.

A plurality of ohmic contacts (not shown) are positioned on the semiconductor stripes, and data conductors including a plurality of data lines 171, a plurality of first drain electrodes 175a, a plurality of second drain electrodes 175b, and a plurality of third drain electrodes 175c are formed thereon.

Each data line 171 includes a first source electrode 173a and a second source electrode 173b extending, respectively, toward the first gate electrode 124a and the second gate electrode 124b.

The first drain electrode 175a, the second drain electrode 175b, and the third drain electrode 175c include one end having a wide area and the other end having a bar shape. The bar-shaped ends of the first drain electrode 175a and the second drain electrode 175b are partially enclosed by the first source electrode 173a and the second source electrode 173b. The wide end of the first drain electrode 175a extends again, thereby forming a third source electrode 173c. A wide end 177c of the third drain electrode 175c overlaps the storage expansion 126 thereby forming a step-down capacitor Cstd, and the bar end is partially enclosed by the third source electrode 173c.

The first/second/third gate electrode 124a/124b/124c, the first/second/third source electrode 173a/173b/173c, and the first/second/third drain electrode 175a/175b/175c form first/second/third thin film transistors (TFT) (Qa/Qb/Qc of FIG. 17) together with the first/second/third semiconductor 154a/154b/154c. A channel of the thin film transistor is formed in each semiconductor 154a/154b/154c between each source electrode 173a/173b/173c and each drain electrode 175a/175b/175c.

The first passivation layer (not shown) is formed on the data conductor and the exposed portion of the semiconductors 154a, 154b, and 154c. The first passivation layer 180a includes a contact hole 188a exposing the first drain electrode 175a and a contact hole 189a exposing the second drain electrode 175b.

A plurality of lower pixel electrodes including a first lower sub-pixel electrode 91a and a second lower sub-pixel electrode 91b are formed on the first passivation layer 180a. The first lower sub-pixel electrode 91a (FIG. 18) includes a main body 92a, a protrusion 95a, a bar-shaped portion 94az, and a connector 93az, and the second lower sub-pixel electrode 91b includes a main body 92b, a protrusion 95b, a bar-shaped portion 94bz, and a connector 93bz. The various detailed shapes and dimensions of the first lower sub-pixel electrode 91a and the second lower sub-pixel electrode 91b are the same as most of the exemplary embodiment shown in FIG. 1 to FIG. 7 such that the detailed description is omitted.

The second passivation layer 180b is positioned on the lower pixel electrode 91a and 91b. The second passivation layer 180b has contact holes 188b and 189b approximately overlapping the contact holes 188a and 189a of the first passivation layer 180a exposing the first and second drain electrodes 175a and 175b, and at least one of the first and second lower sub-pixel electrodes 91a and 91b. The edges of the two corresponding contact holes 188a and 188b may approximately align with each other, and the edges of two contact holes 189a and 189b may approximately align with each other.

A plurality of upper pixel electrodes including first and second upper sub-pixel electrodes 191a and 191b are formed on the second passivation layer 180b.

The overall shape of the first upper sub-pixel electrode 191a is rectangular and includes a stem 192a including a transverse stem and a longitudinal stem, a plurality of minute branches 193a extending outwardly from the stem 192a, connection branches 194ax and 194ay connecting the ends of at least a portion of the minute branches 193a, and a protrusion 195a. The second upper sub-pixel electrode 191b also is a rectangular and includes a stem 192b including a transverse stem and a longitudinal stem, a plurality of minute branches 193b extending outwardly from the stem 192b, connection branches 194bx and 194by connecting the ends of at least a portion of the minute branches 193b, and a protrusion 195b. The detailed shape of the first upper sub-pixel electrode 191a and the second upper sub-pixel electrode 191b is the same as most of the upper pixel electrode of the exemplary embodiment shown in FIG. 1 to FIG. 7 such that the detailed description is omitted.

The first and second lower sub-pixel electrodes 91a and 91b and the first and second upper sub-pixel electrodes 191a and 191b overlap each other via the second passivation layer 180b, and the various possible overlapping arrangements are the same as in the exemplary embodiment shown in FIG. 1 to FIG. 7. FIG. 17 shows the example in which the outer edge of the bar-shaped portions 94az and 94bz of the first and second lower sub-pixel electrodes 91a and 91b is arranged to align with the edge of the first and second upper sub-pixel electrodes 191a and 191b, and FIG. 19 shows the example in which the edge of the main bodies 92a and 92b of the bar-shaped portions 94az and 94bz of the first and second lower sub-pixel electrodes 91a and 91b is arranged to align with the edge of the first and second upper sub-pixel electrodes 191a and 191b.

The first lower sub-pixel electrode 91a and the first upper sub-pixel electrode 191a receive the data voltages from the first drain electrode 175a through the contact holes 188a and 188b, and the second lower sub-pixel electrode 91b and the second upper sub-pixel electrode 191b receives the data voltages from the second drain electrode 175b through the contact holes 189a and 189b.

The description of the upper panel, the liquid crystal layer, the alignment layer, etc. is the same as most of the above-described exemplary embodiment such that the detailed description thereof is omitted.

The operation of the liquid crystal display according to the present exemplary embodiment will now be described.

First, when a gate-on voltage Von is applied to gate line 121, the first and second thin film transistors Qa and Qb connected thereto are turned on, and the data voltage applied to the data line 171 is equally applied to the first lower and upper sub-pixel electrodes 91a and 191a and the second lower and upper sub-pixel electrodes 91b and 191b through the turned-on first and second thin film transistors Qa and Qb. At this time, the step-down gate line 123 is applied with the gate-off voltage Voff.

Next, when the gate-off voltage is applied to the gate line 121 and simultaneously the gate-on voltage is applied to the step-down gate line 123, the first and second switching elements Qh and Ql connected to the gate line 121 are turned off, and the third switching element Qc is turned on. Accordingly, the charges of the second lower and upper sub-pixel electrodes 91b and 191b connected to the output terminal of the second switching element Qb flows in the step-down capacitor Cstd such that the voltage of the second lower and upper sub-pixel electrodes 91b and 191b is decreased. The first lower sub-pixel electrode and second lower subpixel electrode are supplied with different voltages obtained from a same image information, and the first upper sub-pixel electrode and the second upper sub-pixel electrode are supplied with different voltages obtained from the same image information. Therefore, the voltage of the second lower and upper sub-pixel electrodes 91b and 191b is always lower than the voltage of the first lower and upper sub-pixel electrodes 91a and 191a, thereby improving the lateral visibility of the liquid crystal display.

Next, the lower and upper sub-pixel electrodes according to various exemplary embodiments of the liquid crystal display of the exemplary embodiment shown in FIG. 17 will be described with reference to FIG. 20 to FIG. 25. The same constituent elements as in the previous exemplary embodiment are indicated by the same reference numerals, and repetitive description is omitted.

Figure 20:
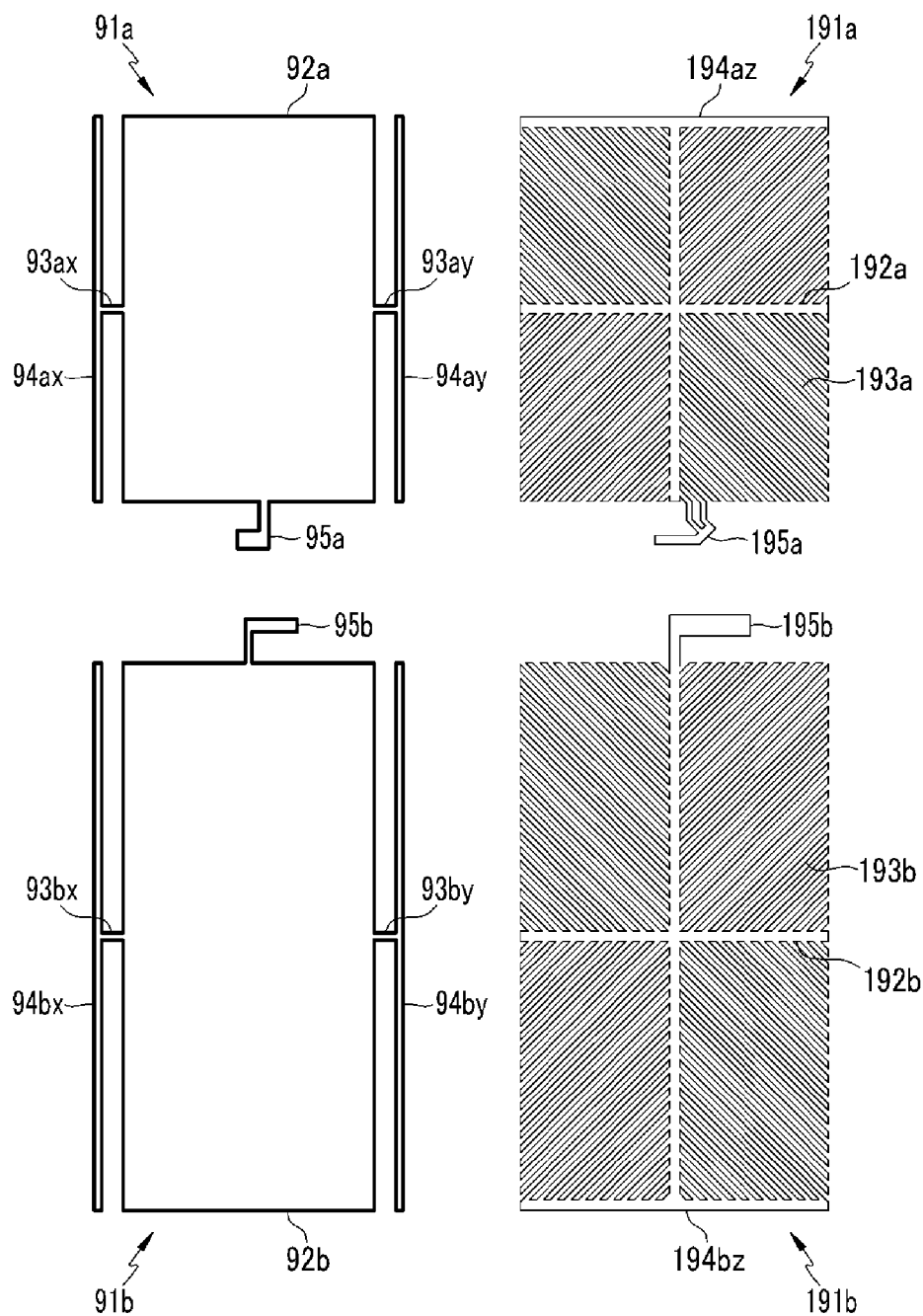
FIG. 20 is a top plan view of a lower pixel electrode and an upper pixel electrode according to an exemplary embodiment.
Figure 21:
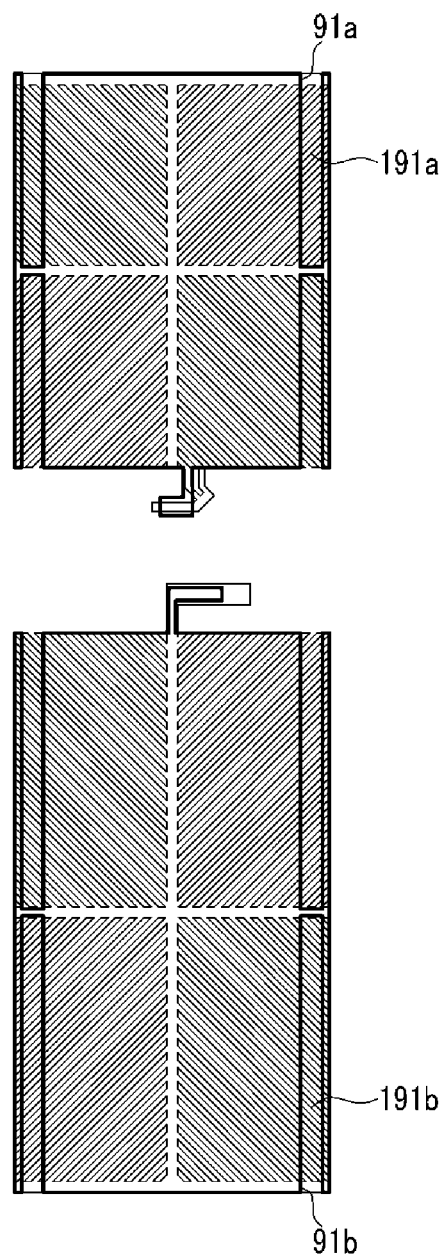

FIG. 20 is a top plan view of a lower pixel electrode and an upper pixel electrode according to an exemplary embodiment, and FIG. 21 and FIG. 22 are layout views showing the lower pixel electrode and the upper pixel electrode of FIG. 20 together.

Referring to FIG. 20, the first and second lower sub-pixel electrodes 91a and 91b of the liquid crystal display according to the present exemplary embodiment are the same as most of the lower pixel electrode shown in FIG. 18, however the bar-shaped portion is not positioned on a top or under side of the main body 92a and 92b, but is positioned at the left side and/or the right side. That is, the first and second lower sub-pixel electrodes 91a and 91b may respectively include main bodies 92a and 92b, bar-shaped portions 94ax and 94bx connected to the main body 92a and 92b through left connections 93ax and 93bx, and/or bar-shaped portions 94ay and 94by connected to the main bodies 92a and 92b through right connections 93ay and 93by. Accordingly, the first upper sub-pixel electrode 191a may comprise a connection branch 194az connecting the upper ends of the minute branches 193a extending upward, and the second upper sub-pixel electrode 191b may comprise a connection branch 194bz connecting the bottom ends of the minute branches 193b extending downward.

Also, the features of the first and second lower sub-pixel electrodes 91a and 91b and the features of the first and second upper sub-pixel electrodes 191a and 191b are the same as most of the lower pixel electrode and the upper pixel electrode of the exemplary embodiment shown in FIG. 11 such that the detailed description thereof is omitted.

The lower pixel electrodes 91a and 91b and the upper pixel electrodes 191a and 191b according to the present exemplary embodiment overlap each other via the second passivation layer, and the left edge and the right edge of the upper pixel electrodes 191a and 191b may be arranged to align, respectively, with the outer edge of the bar-shaped portions 94ax, 94ay, 93bx, and 94by of the lower pixel electrodes 91a and 91b or the edge of the main bodies 92a and 92b facing the bar-shaped portions 94ax, 94ay, 93bx, and 94by, or may be positioned therebetween. FIG. 21 shows an example in which the outer edge of the bar-shaped portions 94ax, 94ay, 93bx, and 94by of the lower pixel electrodes 91a and 91b is arranged to align, respectively, with the edge of the upper pixel electrodes 191a and 191b, and FIG. 22 shows an example in which the edge of the main bodies 92a and 92b facing the bar-shaped portions 94ax, 94ay, 93bx, and 94by of the lower pixel electrodes 91a and 91b is arranged to align, respectively, with the edge of the upper pixel electrodes 191a and 191b.

Figure 23:
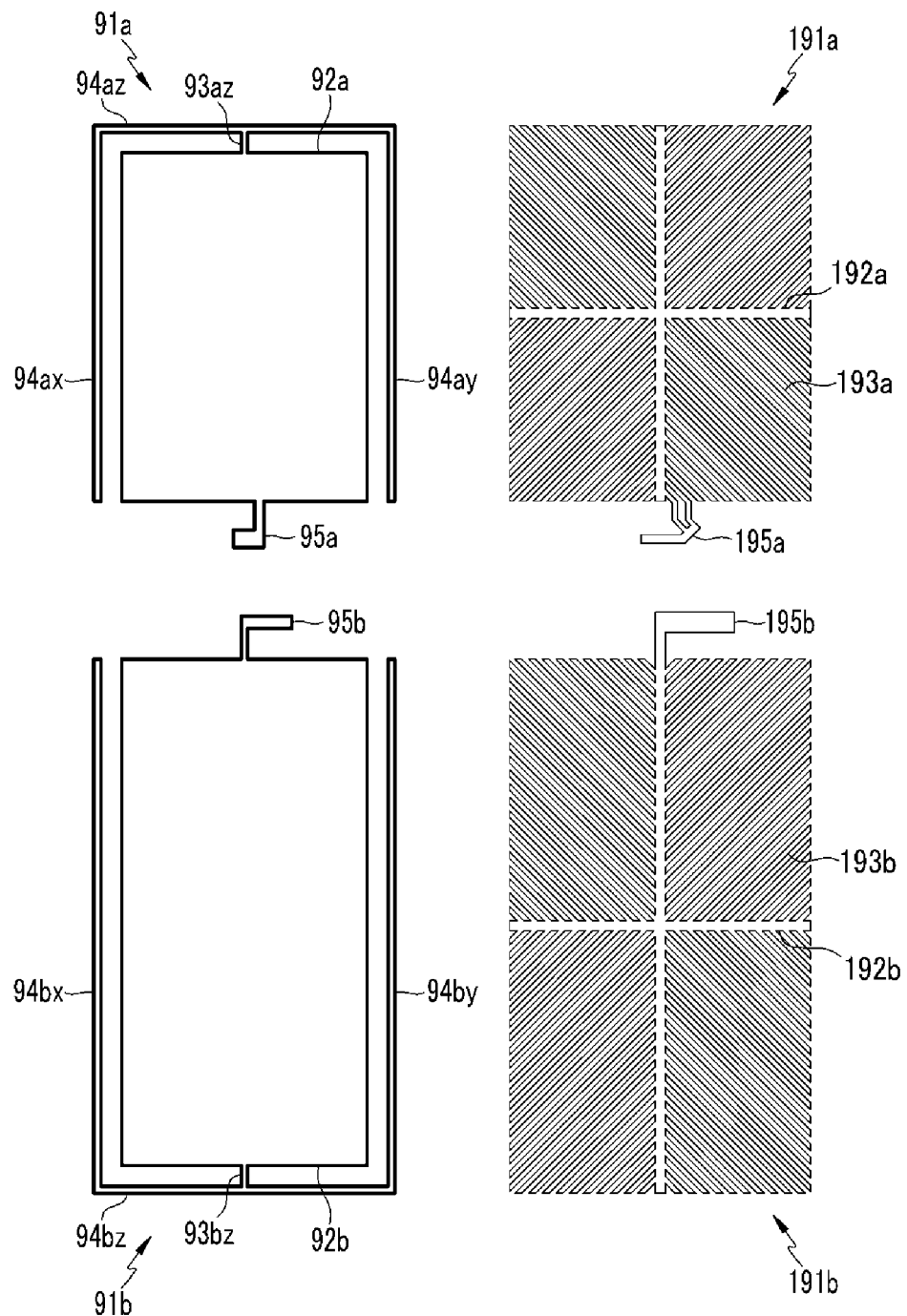
FIG. 23 is a top plan view of a lower pixel electrode and an upper pixel electrode according to an exemplary embodiment.
Figure 24:
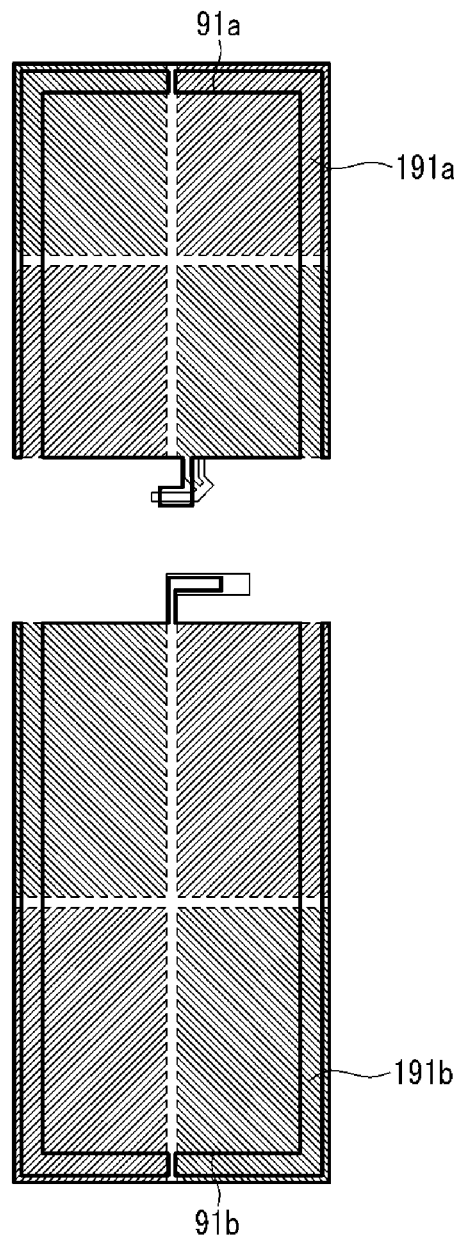

FIG. 23 is a top plan view of a lower pixel electrode and an upper pixel electrode according to an exemplary embodiment, and FIG. 24 and FIG. 25 are layout views showing the lower pixel electrode and the upper pixel electrode of FIG. 23 together.

Referring to FIG. 23, the first and second lower sub-pixel electrodes 91a and 91b of the liquid crystal display according to the present exemplary embodiment may include all the characteristics of the lower pixel electrode of the exemplary embodiment shown in FIG. 18 and the exemplary embodiment of FIG. 20. That is, the first and second lower sub-pixel electrodes 91a and 91b may respectively include main bodies 92a and 92b, bar-shaped portions 94ax and 94bx connected to the main bodies 92a and 92b through the connectors, bar-shaped portions 94ay and 94by connected to the main bodies 92a and 92b through the connectors, and bar-shaped portions 94az and 94bz connected to the main bodies 92a and 92b through the connectors 93az and 93bz. As shown in FIG. 23, the connectors connecting the left and right bar-shaped portions 94ax, 94bx, 94ay, and 94by to the main body 92a and 92b along the left and right sides of the main body 92a, 92b may be omitted, as bar-shaped portions 94ax, 94bx, 94ay, and 94by are connected, respectively, to bar-shaped portions 94az and 94bz, which are connected to the main body 92a and 92b via connectors 93az and 93bz.

Also, the first and second upper sub-pixel electrodes 191a and 191b of the liquid crystal display according to the present exemplary embodiment may be the same as most of the upper pixel electrode 191 shown in FIG. 14 and FIG. 17.

The lower pixel electrodes 91a and 91b and the upper pixel electrodes 191a and 191b according to the present exemplary embodiment overlap each other via the second passivation layer, and the outer edge of the upper pixel electrodes 191a and 191b may be arranged to align, respectively, with the outer edge of the bar-shaped portions 94ax, 94ay, 94az, 94bx, 94by, and 94bz of the lower pixel electrode 91a and 91b or the edge of the main bodies 92a and 92b facing the bar-shaped portions 94ax, 94ay, 94az, 94bx, 94by, and 94bz, or may be positioned therebetween. FIG. 24 shows an example in which the outer edge of the bar-shaped portions 94ax, 94ay, 94az, 94bx, 94by, and 94bz of the lower pixel electrodes 91a and 91b is arranged to align, respectively, with the edge of the upper pixel electrodes 191a and 191b, and FIG. 25 shows an example in which the edge of the main bodies 92a and 92b facing the bar-shaped portions 94ax, 94ay, 94az, 94bx, 94by, and 94bz of the lower pixel electrodes 91a and 91b is arranged to align, respectively, with the edge of the upper pixel electrodes 191a and 191b.

The structure according to the various exemplary embodiments may be applied to a liquid crystal display of various structures including an upper pixel electrode including a plurality of minute branch electrodes and a lower pixel electrode overlapping the plurality of minute branch electrodes.

While the embodiments have been described in connection with what is presently considered to be practical exemplary embodiments, it is to be understood that the invention is not limited to the disclosed embodiments, but, on the contrary, is intended to cover various modifications and equivalent arrangements included within the spirit and scope of the disclosure including the appended claims.

<Description of Symbols>

| | |
|---|---|
| 3: liquid crystal layer | 11, 21: alignment layer |
| 31: liquid crystal molecule | 91, 91a, 91b: lower pixel electrode |
| 100: lower panel | 110, 210: insulation substrate |
| 121, 123: gate line | |
| 124, 124a, 124b, 124c: gate electrode | |
| 125: storage electrode line | |
| 140: gate insulating layer | 154, 154a, 154b, 154c: semiconductor |
| 163, 165: ohmic contact | 171: data line |
| 173, 173a, 173b, 173c: source electrode | |
| 175, 175a, 175b, 175c: drain electrode | |
| 180a, 180b: passivation layer | |
| 185, 185a, 185b, 188a, 188b, 189a, 189b: contact hole | |
| 191, 191a, 191b: upper pixel electrode | |
| 200: upper panel | 220: light blocking member |
| 230: color filter | 250: overcoat |
| 270: opposing electrode | |

What is claimed is:

1. A liquid crystal display comprising:
a first substrate and a second substrate facing each other;
a liquid crystal layer between the first substrate and the second substrate;
a lower pixel electrode positioned on the first substrate;
a first passivation layer positioned on the lower pixel electrode;
an upper pixel electrode positioned on the first passivation layer; and
an opposing electrode positioned on the second substrate,
wherein the upper pixel electrode comprises a stem and a plurality of minute branches extending outwardly from the stem, and
the lower pixel electrode comprises a main body overlapping the plurality of minute branches and at least one bar-shaped portion extending along an edge of the main body maintaining a gap with the edge of the main body.

2. The liquid crystal display of claim 1, wherein
a position of an edge of the upper pixel electrode is arranged in one of: alignment with an outer edge of the bar-shaped portion of the lower pixel electrode, alignment with the edge of the main body facing the bar-shaped portion, and between the outer edge of the bar-shaped portion of the lower pixel electrode and the edge of the main body facing the bar-shaped portion.

3. The liquid crystal display of claim 2, wherein
the lower pixel electrode and the upper pixel electrode are electrically connected to each other.

4. The liquid crystal display of claim 3, further comprising
at least one connector connecting the bar-shaped portion and the main body.

5. The liquid crystal display of claim 4, wherein
ends of the minute branch electrodes of the upper pixel electrode facing the bar-shaped portion are separated from each other.

6. The liquid crystal display of claim 5, wherein
the upper pixel electrode further comprises a connection branch connecting the ends of the minute branch electrodes of the upper pixel electrode that do not face the bar-shaped portion.

7. The liquid crystal display of claim 6, wherein
a length of the bar-shaped portion is equal to or more than ½ of a length of the edge of the main body facing the bar-shaped portion.

8. The liquid crystal display of claim 7, wherein
a width of the connector is larger than 0 and less than a sum of a width of the stem of the upper pixel electrode and 1 μm.

9. The liquid crystal display of claim 8, wherein
a width of the bar-shaped portion is more than 0 and less than 10 μm.
10. The liquid crystal display of claim 9, wherein
a length of the connector is larger than 0.
11. The liquid crystal display of claim 10, wherein
the lower pixel electrode comprises a first lower sub-pixel electrode and a second lower sub-pixel electrode that are supplied with different voltages obtained from a same image information, and
the upper pixel electrode comprises a first upper sub-pixel electrode and a second upper sub-pixel electrode that are supplied with the different voltages obtained from the same image information.
12. The liquid crystal display of claim 1, wherein
the lower pixel electrode and the upper pixel electrode are electrically connected to each other.
13. The liquid crystal display of claim 1, further comprising
at least one connector connecting the bar-shaped portion and the main body.
14. The liquid crystal display of claim 13, wherein
a width of the connector is larger than 0 and less than a sum of a width of the stem of the upper pixel electrode and 1 μm.
15. The liquid crystal display of claim 13, wherein
a length of the connector is larger than 0.
16. The liquid crystal display of claim 1, wherein
ends of the minute branch electrodes of the upper pixel electrode facing the bar-shaped portion are separated from each other.
17. The liquid crystal display of claim 1, wherein
the upper pixel electrode further comprises a connection branch connecting the ends of the minute branch electrodes of the upper pixel electrode that do not face the bar-shaped portion.
18. The liquid crystal display of claim 1, wherein
a length of the bar-shaped portion is equal to or more than ½ of a length of the edge of the main body facing the bar-shaped portion.
19. The liquid crystal display of claim 1, wherein
a width of the bar-shaped portion is more than 0 and less than 10 μm.
20. The liquid crystal display of claim 1, wherein
the lower pixel electrode comprises a first lower sub-pixel electrode and a second lower sub-pixel electrode that are supplied with different voltages obtained from a same image information, and
the upper pixel electrode comprises a first upper sub-pixel electrode and a second upper sub-pixel electrode that are supplied with different voltages obtained from the same image information.

* * * * *